United States Patent
Uehara

[11] Patent Number: 5,762,157
[45] Date of Patent: Jun. 9, 1998

[54] VEHICLE ATTITUDE CONTROL APPARATUS WHEREIN TIRE SLIP ANGLE AND WHEEL LONGITUDINAL FORCE ARE CONTROLLED

[75] Inventor: Yasuo Uehara, Toyota, Japan

[73] Assignee: Toyota Jidosha Kabushiki Kaisha, Toyota, Japan

[21] Appl. No.: 602,230

[22] Filed: Feb. 15, 1996

[30] Foreign Application Priority Data

Feb. 20, 1995 [JP] Japan ................................. 7-030656

[51] Int. Cl.$^6$ .................................................. B60K 27/02
[52] U.S. Cl. ............................ 180/197; 303/148; 701/90
[58] Field of Search ............................ 180/197; 303/148, 303/146, 163; 364/426.027, 426.028, 426.029; 701/82, 83, 90, 88

[56] References Cited

U.S. PATENT DOCUMENTS

| | | | |
|---|---|---|---|
| 5,402,341 | 3/1995 | Liubakka et al. | 180/412 X |
| 5,488,555 | 1/1996 | Asgari et al. | 364/424.05 |
| 5,504,680 | 4/1996 | Yamashita et al. | 364/426.027 |
| 5,576,959 | 11/1996 | Hrovat et al. | 364/426.027 |
| 5,597,215 | 1/1997 | Fischle et al. | 303/139 |
| 5,652,383 | 7/1997 | Yamamoto et al. | 180/197 X |
| 5,668,724 | 9/1997 | Ehret et al. | 180/197 X |

FOREIGN PATENT DOCUMENTS

| | | |
|---|---|---|
| A-4010332 | 10/1990 | European Pat. Off. . |
| A-4300255 | 7/1993 | European Pat. Off. . |
| 5-185944A | 7/1993 | Japan . |

OTHER PUBLICATIONS

"Vehicle Dynamics And Control", p. 36, first edition, Jul. 20, 1992; Kabushiki Kaisha Sankaido.

*Primary Examiner*—Christopher P. Ellis
*Attorney, Agent, or Firm*—Kenyon & Kenyon

[57] ABSTRACT

An apparatus for controlling an attitude of a motor vehicle, including a longitudinal force control device for controlling a torque of a wheel of the motor vehicle to thereby control a longitudinal force which acts in a longitudinal direction of the vehicle between the wheel and a road surface, and a tire slip angle control portion for controlling a tire slip angle of the wheel such that an absolute value of the tire slip angle is smaller when the longitudinal force control device is in operation than when the longitudinal force control device is not in operation.

17 Claims, 16 Drawing Sheets

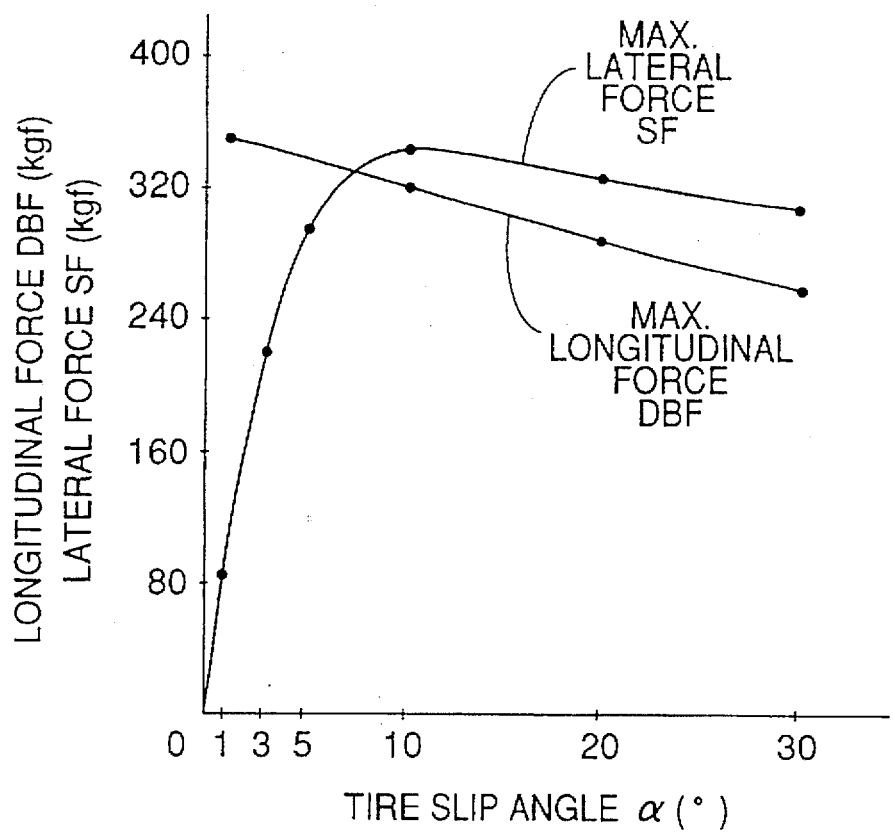

VEHICLE ATTITUDE CONTROL APPARATUS WHEREIN TIRE SLIP ANGLE AND WHEEL LONGITUDINAL FORCE ARE CONTROLLED

BACKGROUND OF THE INVENTION

1. Field of the Invention

The present invention relates in general to an apparatus for controlling the attitude of a running motor vehicle by controlling longitudinal forces acting on the wheels of the vehicle. More particularly, this invention is concerned with a technique for controlling the longitudinal forces on the vehicle wheels so as to maximize the longitudinal forces.

2. Discussion of the Related Art

There have been proposed various types of vehicle attitude control apparatus. One example of such vehicle attitude control apparatus is adapted to control the yaw moment of the running vehicle by controlling the rotating torque values of the vehicle wheels to thereby control the longitudinal forces acting on the vehicle, more specifically, drive forces or braking forces which are generated between the wheels and the road surface in the longitudinal direction of the vehicle. For example, such vehicle attitude control apparatus is arranged to establish a suitable difference between the longitudinal forces on the right and left wheels, while the drive force or braking force is transmitted or applied to the wheels. Another apparatus is arranged to establish such longitudinal force difference of the right and left wheels, irrespective of whether the drive force or braking force is transmitted or applied to the wheels.

JP-A-5-185944 discloses a vehicle attitude control apparatus including a yaw moment control braking device and a rear steering control device. The yaw moment control braking device is adapted to apply different braking forces to the right and left wheels so as to control the yaw moment of the vehicle, while the rear steering control device is adapted to control the steering angle of the rear wheels. The yaw moment control braking device is one form of a longitudinal force control device to control the longitudinal forces acting on the wheels, while the rear steering control device is one form of a lateral force control device to control the lateral forces acting on the wheels. These two devices are operated concurrently or in parallel with each other to control the vehicle attitude. in this vehicle attitude control apparatus, the required control range of each of the two control devices (longitudinal force control device) can be made narrower than that of a single control device (capable of controlling only the longitudinal or lateral force control device) provided in a vehicle attitude control apparatus. Accordingly, the load assigned to each of the two control device of the vehicle attitude control apparatus disclosed in the above-indicated publication JP-A-5-185944 is reduced.

It is noted that devices other than the rear steering control device may be used as the lateral force control device for controlling the forces acting between the wheels and the road surface in the lateral direction of the vehicle For instance, the lateral force control device may be a front steering control device for controlling the steering angle of the front wheels, or a device adapted to control the roll stiffness distribution of front and rear suspension systems of the vehicle.

A research was made by the present applicant on a vehicle attitude control apparatus for controlling the attitude of a motor vehicle by controlling the longitudinal forces acting on the vehicle wheels. This research revealed the following fact:

The maximum value of the longitudinal force which acts on a vehicle wheel as a result of controlling the longitudinal force is not held constant, but decreases with an increase in the slip angle of the tire of the wheel. The tire slip angle varies, for example, where the longitudinal force on the vehicle wheel is controlled while the lateral force on the same vehicle wheel is concurrently controlled. In the presence of the varying tire slip angle, the vehicle attitude may not be effectively controlled by controlling the longitudinal force acting on the vehicle wheel. This fact will be described in detail.

Graphs of FIGS. 15(a) and 15(b) show characteristics of a vehicle wheel tire when it is driven or braked in the presence of the varying slip angle of the tire, as indicated in FIG. 2.36 on page 36, VEHICLE DYNAMICS AND CONTROL, first edition, Jul. 20, 1992, Kabushiki Kaisha Sankaido, Japan. An analysis of these graphs finds out the following two facts:

1) The maximum value of a longitudinal force DBF, which is a drive force or braking force applied to a vehicle wheel under control of a longitudinal force control device, decreases as the tire slip angle $\alpha$ increases, as indicated in the graph of FIG. 16.

2) The maximum value of a lateral force SF acting on the wheel under control of a lateral force control device increases substantially proportionally to the tire slip angle $\alpha$ while the tire slip angle is within a range from 0° to about 10°, but is saturated at the tire slip angle $\alpha$ slightly over 10°, and decreases with a further increase in the tire slip angle $\alpha$.

The above facts indicate that when the lateral force and the longitudinal force are controlled concurrently, the effect of the longitudinal force control device to control the vehicle attitude Is not sufficiently high when the tire slip angle $\alpha$ is relatively large.

In the vehicle attitude control device disclosed in JP-A-5-185944, the longitudinal force control device and the lateral force control device are operated concurrently, and the tire slip angle may be changed by the lateral force control device during operation of the longitudinal force control device. Therefore, the effect of the longitudinal force control device is not sufficient when the tire slip angle is relatively large.

It is also noted that even in the vehicle attitude control device adapted to control only the longitudinal force, the tire slip angle may be relatively large, and the operation of the apparatus is not effective to control the vehicle attitude where the tire slip angle is relatively large.

SUMMARY OF THE INVENTION

It is therefore an object of the present invention to provide a vehicle attitude control apparatus adapted such that the tire slip angle of a vehicle wheel is made smaller when a longitudinal force control device is in operation, than when the device is not in operation, so as to maximize the effect of an operation of the longitudinal force control device on the vehicle attitude.

The above object may be achieved according to the principle of this invention, which provides an apparatus for controlling an attitude of a motor vehicle, comprising a longitudinal force control device for controlling a torque of a wheel of the motor vehicle to thereby control a longitudinal force which acts in a longitudinal direction of the vehicle between the wheel and a road surface, and a tire slip angle control portion for controlling a tire slip angle of the wheel such that an absolute value of the tire slip angle is smaller when the longitudinal force control device is in operation than when the longitudinal force control device is not in operation.

The longitudinal force control device may be adapted to suitably control a distribution of braking forces to be applied to right and left wheels of the vehicle, upon braking of the vehicle, or suitably control a distribution of drive forces to be applied to the right and left wheels, when the wheels are driven. The longitudinal force control device may also be adapted to apply brake to the vehicle so as to control the yaw moment of the vehicle when the vehicle is not braked by the vehicle operator or when the wheels are not driven. Alternatively, the longitudinal force control device may be adapted to suitably control a distribution of braking forces or driving forces to be applied to front and rear wheels.

The tire slip angle is interpreted to mean an angle of the rotation plane of the wheel with respect to the running or longitudinal direction of the vehicle.

In one form of the tire slip angle control portion which controls the tire slip angle such that its absolute value is smaller when the longitudinal force control device is in operation than when the longitudinal force control device is not in operation, the absolute value of the tire slip angle is reduced when the longitudinal force control device which has been held in its non-operated state is operated. In another form of the tire slip angle control portion, the absolute value is increased from a comparatively small value to a comparatively large value when the longitudinal force control device which has been operated is brought to its non-operated state.

In the vehicle attitude control apparatus of the present invention constructed as described above, the absolute value of the tire slip angle of the wheel is made smaller when the longitudinal force control device is in operation than when the longitudinal force control device is not in operation. In this respect, it is noted that the maximum value of the longitudinal force acting on the wheel increases with a decrease in the absolute value of the tire slip angle. Therefore, the present apparatus permits the maximum value of the longitudinal force to be generated by the longitudinal force control device to be held at a relatively high level, thereby increasing the effect of the longitudinal force control device of controlling the attitude of the running vehicle.

According to one preferred form of the present invention, the vehicle attitude control apparatus further comprises a lateral force control device for controlling a steering angle of the wheel to thereby control a lateral force which acts in a lateral direction of the vehicle between the wheel and the road surface, and the tire slip angle control portion includes first slip angle reducing means for reducing the absolute value of the tire slip angle when the longitudinal force control device is in operation, such that an amount of reduction of the absolute value is determined on the basis of the longitudinal force which is to be established by an operation of the longitudinal force control device concurrently with an operation of the lateral force control device. In other words, the tire slip angle is reduced as needed, or optimized in relation to the longitudinal force to be controlled for the wheel by the longitudinal force control device. In this form of the invention, the lateral force acting on the wheel will not be reduced excessively even when the vehicle is running in a condition in which a decrease in the tire slip angle causes a decrease in the lateral tire force. Thus, the longitudinal force and the lateral force can be maximized as a whole, so that the longitudinal and lateral forces acting on the wheel cooperate to effectively control or correct the vehicle attitude.

In one advantageous arrangement of the above preferred form of the invention, the tire slip angle control portion further includes second slip angle reducing means for reducing the absolute value of the tire slip angle when the longitudinal force control device is in operation, such that the amount of reduction of the absolute value is smaller when the longitudinal force acting between the wheel and the road surface should not be increased, than when the longitudinal force should be increased. In this instance, the second slip angle reducing means may be adapted to effect a determination as Lo whether the longitudinal force should be increased or not, depending upon a location of the wheel in the vehicle. In this respect, it is noted that the yaw moment of the vehicle effective to suitably control the vehicle attitude should be maximized. However, this yaw moment cannot be maximized by maximizing the longitudinal force acting on each and every wheel of the vehicle. That is, whether the longitudinal force acting on a given wheel should be increased or not to suitably control the vehicle attitude depends upon the location of that wheel. In the present arrangement wherein the amount of reduction of the tire slip angle of the wheel is determined depending upon the location of the wheel, namely, depending upon whether the wheel in question is a right front wheel, a left front wheel, a right rear wheel or a left rear wheel. According to this arrangement, the yaw moment to suitably control or correct the vehicle attitude can be maximized owing to selective reduction of the tire slip angle depending upon the location of the wheels.

BRIEF DESCRIPTION OF THE DRAWINGS

The above and optional objects, features, advantages and technical significance of the present invention will be better understood by reading the following detailed description of a presently preferred embodiment of the invention, when considered in connection with the accompanying drawings, in which:

FIG. 16 is a graph for explaining changes in maximum lateral and longitudinal forces SF and DBF acting on the wheels, in relation to slip angle α of the wheel tire.

DETAILED DESCRIPTION OF THE PREFERRED EMBODIMENT

Figure 1:
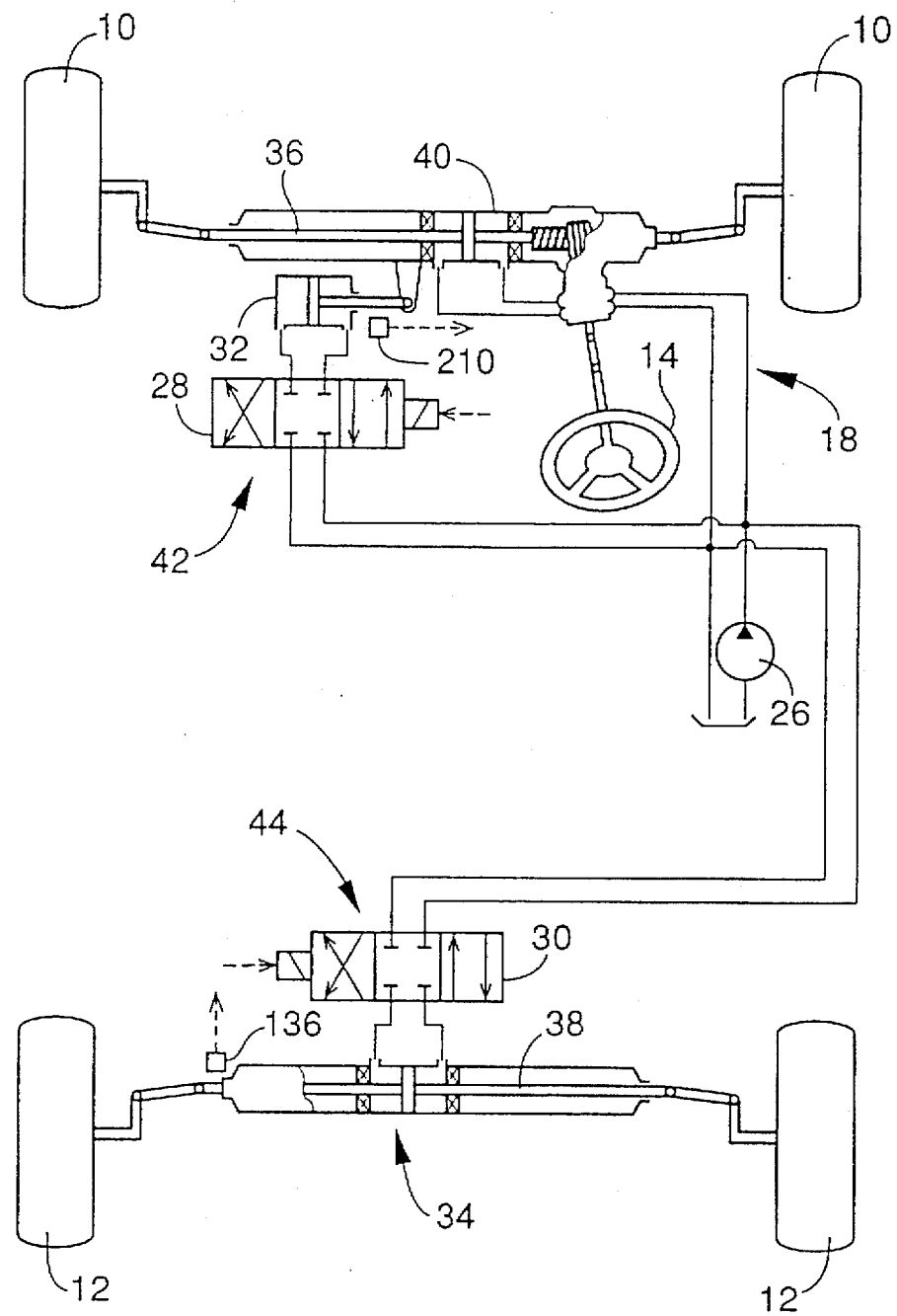
FIG. 1 is a plan view showing a wheel steering system of a four-wheel automotive vehicle equipped with a vehicle attitude control apparatus constructed according to one embodiment of this invention.

A vehicle attitude control apparatus which is constructed according to one embodiment of this invention and which will be described is provided on a four-wheel automotive vehicle having right and left front wheels 10 and right and left rear wheels 12 as shown in FIG. 1. The front wheels 10 are steered by an operator of the vehicle through a steering wheel 14 whose angular position is represented by a rotation angle θ (steering wheel angle θ). A force applied from the vehicle operator to the steering wheel 14 is boosted by a hydraulically operated power steering device 18. The vehicle in question is a rear-drive vehicle in which the rear wheels 12 are driven by an engine, while the front wheels 10 are idler wheels.

Figure 2:
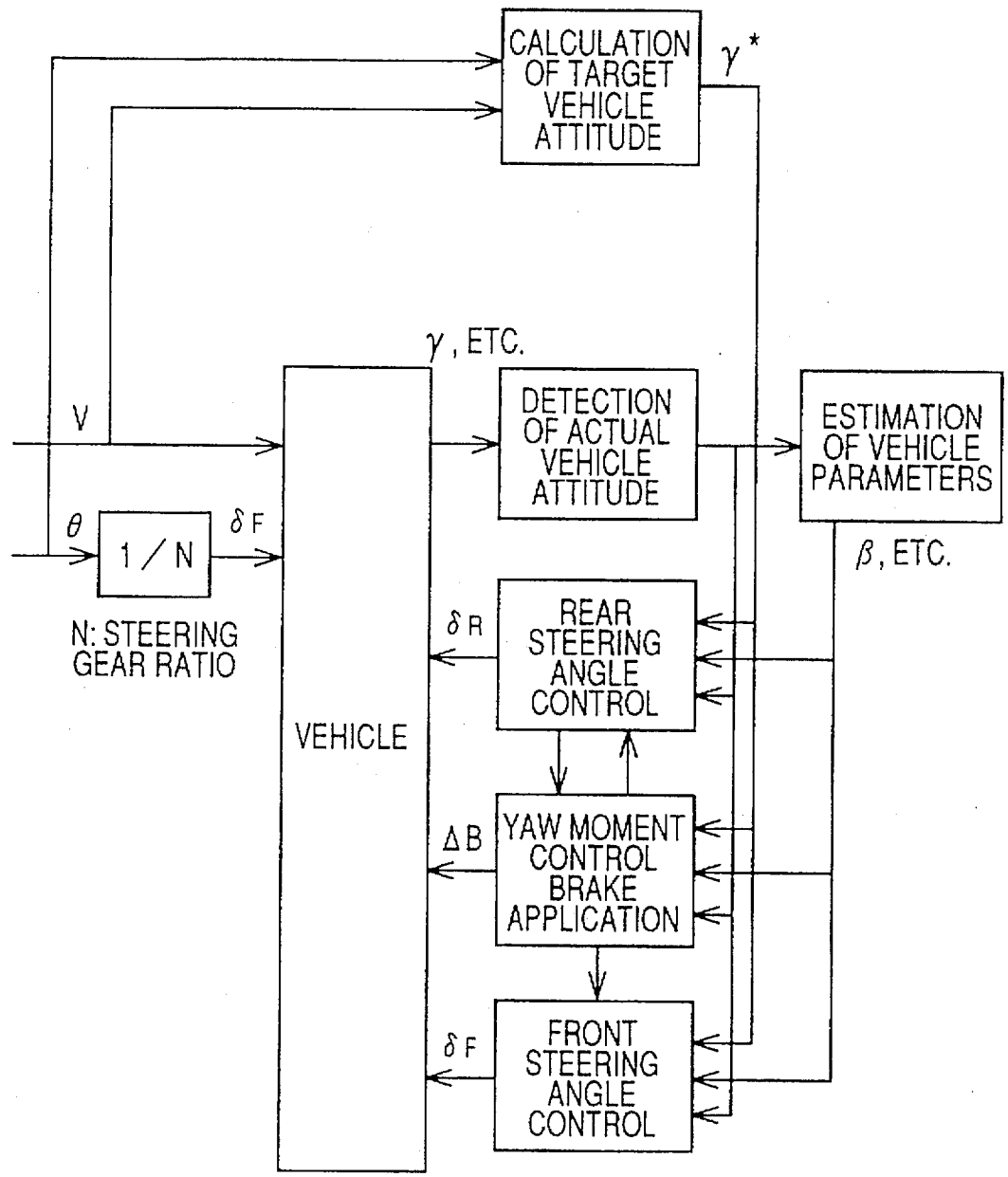
FIG. 2 is a block diagram illustrating functions of the vehicle attitude control apparatus.

Referring to the block diagram of FIG. 2, there are indicated functions to be performed by the vehicle attitude control apparatus provided on the vehicle. It will be understood from FIG. 2 that the vehicle attitude control apparatus is adapted to control the attitude of the vehicle during running, by controlling a rear steering angle $\delta_R$ and a front steering angle $\delta_F$, and by braking the right and left wheels 10, 12 with different braking forces so as to control the yaw moment of the vehicle. Controlling the rear and front steering angles $\delta_R$, $\delta_F$ is one form of controlling the lateral forces acting on the vehicle wheels, while the brake application to control the vehicle yaw moment is one form of controlling the longitudinal forces acting on the wheels.

To control the lateral forces acting on the wheels 10, 12 to thereby control the vehicle attitude, the rear steering angle $\delta_R$ is controlled on the basis of a target attitude of the vehicle (i.e., control target of the vehicle attitude control apparatus). The target attitude is determined by a running speed V of the vehicle and the steering wheel angle θ. In the present specific embodiment, a target yaw rate γ* is determined as the target vehicle attitude, on the basis of the vehicle speed V and steering wheel angle θ. The target yaw rate γ* is a yaw rate which is to be established on the assumption that the vehicle is turning along a circle (circular arc) at a substantially constant speed. The rear steering angle $\delta_R$ is controlled so that the actual yaw rate γ coincides with the determined target yaw rate γ*.

To control the longitudinal forces acting on the wheels to thereby control the vehicle attitude, yaw moment control brake is applied to the vehicle such that there is produced a difference $\Delta_B$ between the braking force acting on the right wheel or wheels 10, 12 and the braking force acting on the left wheel or wheels 10, 12. In the present embodiment, the target yaw rate γ* is determined as the target vehicle attitude, on the basis of the vehicle speed V and the steering wheel angle θ, and the braking force difference $\Delta_B$ is controlled to control the vehicle yaw moment so that the actual vehicle attitude as estimated from the vehicle speed V, steering wheel angle θ, actual yaw rate γ, actual lateral vehicle acceleration Gy, etc. coincides with the determined target vehicle attitude. This brake application to control the yaw moment of the vehicle is not necessarily initiated when the vehicle attitude is found abnormal, but is initiated only when it is found that the abnormal vehicle attitude has not been corrected by controlling the rear steering angle $\delta_R$.

To control the lateral forces acting on the wheels to thereby control the vehicle attitude, the front steering angle $\delta_F$ is also controlled when the yaw moment control brake is applied. This control of the front steering angle $\delta_F$ is effected to supplement the vehicle attitude control by the control of the rear steering angle $\delta_R$ and the yaw moment control brake application.

The front and rear steering angle controls and the brake application to control the yaw moment as generally described above are effected depending upon other parameters of the vehicle. Described more specifically, the rear and front steering angles $\delta_R$, $\delta_F$ are controlled depending upon a slip angle β of the vehicle body, and depending upon lateral tire forces of the rear wheels 12, for example, depending upon whether or not the lateral tire forces are linearly increasing with an increase in tire slip angle, as described below in detail. Further, the moment at which the yaw moment control brake is applied to the vehicle is determined depending upon the vehicle slip angle β and a derivative β' of the slip angle β. The derivative β' represents a rate of change of the vehicle slip angle β.

To control the vehicle attitude as briefly described above, the vehicle attitude control apparatus includes a rear steering control device 100, a yaw moment control braking device 102, a front steering control device 104 and a vehicle parameter estimating device 106. Electrical control arrangements of these devices 100, 102, 104, 106 are schematically shown in FIGS. 4, 7, 9 and 11, respectively.

Before describing the electrical control arrangements of those devices 100, 102, 104, 106, there will be described mechanical arrangements of the devices 100, 102 and 104.

The rear and front steering control devices 100, 104 are provided to electrically control the steering angles $\delta_R$ and $\delta_F$ of the rear and front wheels 12, 10. As shown in FIG. 1, the wheel steering system of the vehicle includes the power steering device 18, which comprises a power steering pump 26 as a hydraulic power source. The power steering pump 26 is connected to hydraulic cylinders 32, 34 through solenoid-operated 3-position directional control valves 28, 30, respectively. The hydraulic cylinder 32 is adapted to displace a power cylinder 40 relative to a front steering bar 36 in the lateral direction of the vehicle, for thereby steering the front wheel 10. The hydraulic cylinder 34 is adapted to displace a rear steering bar 38 in the lateral direction, for thereby steering the rear wheel 12.

In the present embodiment, the solenoid-operated directional control valve 28, hydraulic cylinder 32 and front steering bar 36 (power cylinder 40) constitute a front steering actuator 42 as indicated in FIG. 1, while the solenoid-operated directional control valve 30, hydraulic cylinder 34 and rear steering bar 38 constitute a rear steering actuator 44 as indicated in FIG. 1.

Figure 3:
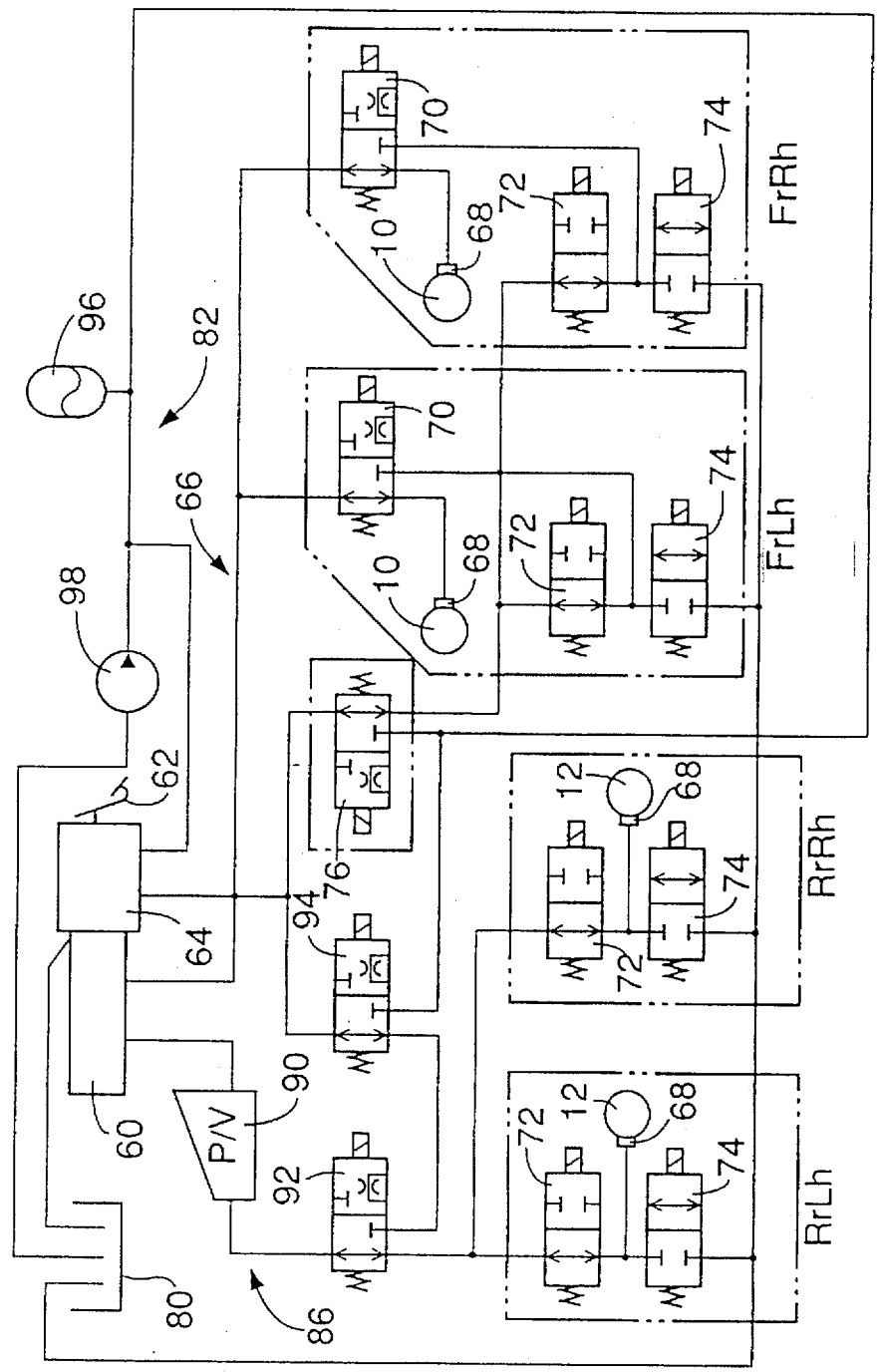
FIG. 3 is a schematic view showing a manually and electrically controlled braking system used as a yaw moment control braking device incorporated in the vehicle attitude control apparatus, for applying yaw moment control braking to the vehicle as generally indicated in FIG. 2.

The yaw moment control braking device 102 uses a manually and electrically controlled braking system as shown in FIG. 3. The yaw moment control braking device 102 is arranged to activate the braking system of the vehicle, without an operation of a brake pedal by the vehicle operator, for braking the right and left wheels 10, 12 so as to establish a suitable difference ΔB between the braking forces of the right and left wheels, for controlling the yaw moment of the vehicle to thereby control the attitude of the vehicle. This braking system of FIG. 3 is also controlled by an anti-lock brake control device and a traction control device. Accordingly, the braking system includes elements necessary for anti-lock control of the braking pressure for each wheel and for traction control of the rear wheels 12 (drive wheels). Those elements will also be explained. It is noted that the "anti-lock control" is interpreted to mean controlling the braking pressure for each wheel to regulate the braking torque of the wheel while preventing locking or skidding of the wheel on the road surface during brake application to the vehicle, and that the "traction control" is interpreted to mean controlling at least one of the driving torque and the braking torque of the drive wheels (rear wheels 12) so as to prevent slipping or spinning of the drive wheels on the road surface, upon starting or acceleration of the vehicle.

Referring to FIG. 3, the braking system is provided with a master cylinder 60 of tandem type, which has two mutually independent pressurizing chambers. Upon operation of a brake operating member in the form of a brake pedal 62, a depression force acting on the brake pedal 62 is boosted by a brake booster 64, and the master cylinder 60 is activated to produce fluid pressures in the two pressurizing chambers, according to the boosted force received from the brake booster 64.

One of the two pressurizing chambers of the master cylinder 60 is connected through a primary fluid passage 66 to wheel brake cylinders 68 for the right and left front wheels 10. The primary fluid passage 66 consists of a common passage portion connected to the appropriate pressurizing chamber, and two branch passage portions which connect the common passage portion and the respective front wheel brake cylinders 68.

In each of the two branch passage portions of the primary fluid passage 66, there is provided a master cylinder cut valve 70, which is a solenoid-operated directional control valve. This master cylinder cut valve 70 is normally placed in a position for connecting the wheel brake cylinders 68 to the master cylinder 60. Upon operation of the yaw moment control braking device 102 or the anti-lock brake control device, the master cylinder cut valve 70 is brought to a position for disconnecting the wheel brake cylinders 68 from the master cylinder 60 and connecting the wheel brake cylinders 68 to a pressure raising valve 72 and a pressure reducing valve 74, which are solenoid-operated pressure regulating valves in the form of shut-off valves. The pressure raising valve 72 is connected to a selector valve 76, which is a solenoid-operated flow control valve. The selector valve 76 is normally placed in a position for connecting the pressure raising valve 72 to a reservoir 80 through the brake booster 64. Upon operation of the yaw moment control braking device 102, the selector valve 76 is brought to a position for disconnecting the pressure raising valve 72 from the reservoir 80 and connecting the valve 72 to an electrically controlled hydraulic pressure source 82. When the yaw moment control braking device 102 is activated, therefore, the brake cylinders 68 for the front wheels 10 are operated by a fluid pressure supplied from the electrically controlled hydraulic pressure source 82. The pressure reducing valve 74 is connected to the reservoir 80.

The other pressurizing chamber of the master cylinder 60 is connected through another primary fluid passage 86 to wheel brake cylinders 68 for the right and left rear wheels 12. Like the primary fluid passage 66, the primary fluid passage 86 consists of a common passage portion connected to the master cylinder 60, and two branch passage portions connected to the rear wheel brake cylinders 68.

Figure 4:
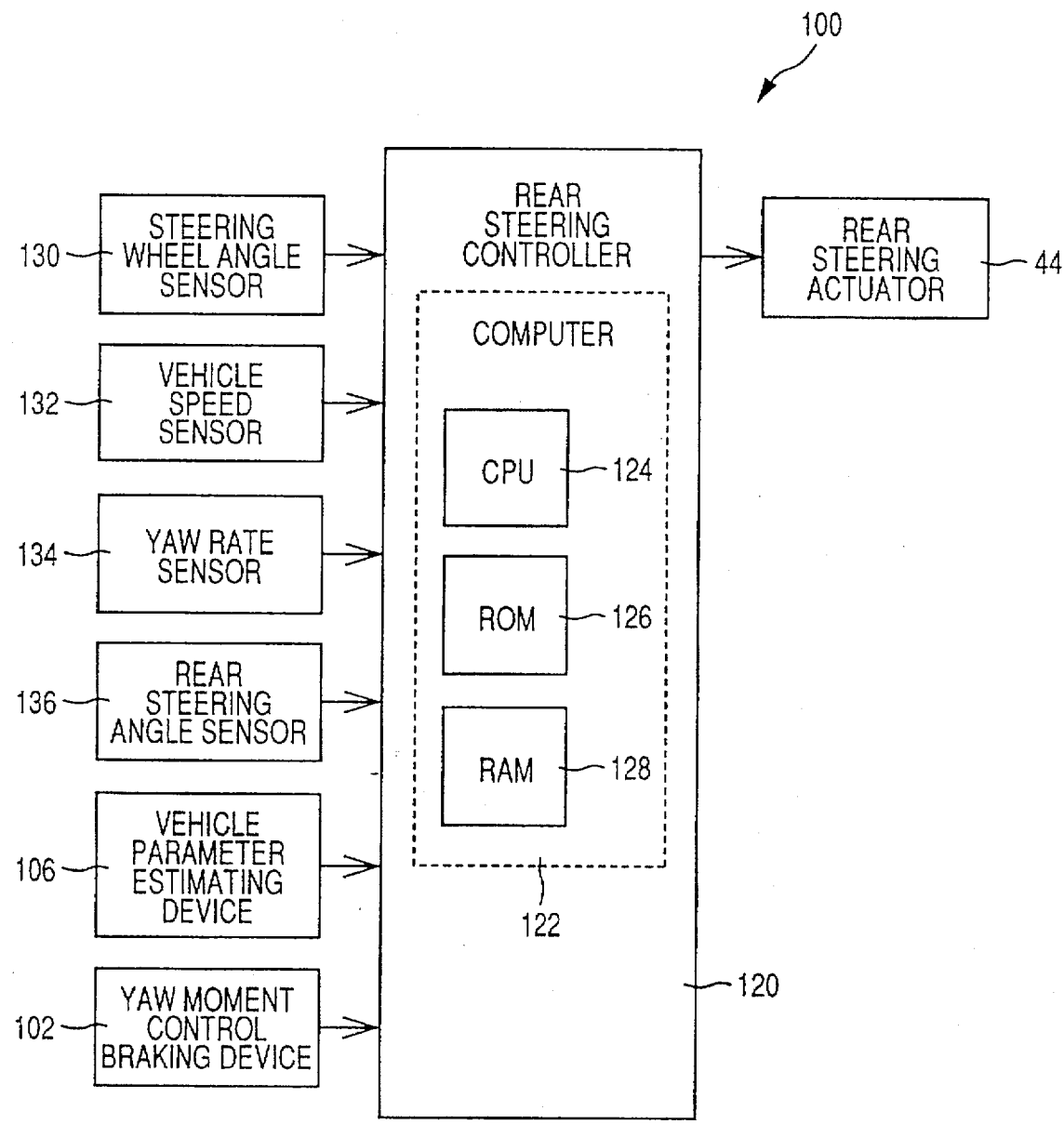
FIG. 4 is a block diagram showing an electrical control arrangement of a rear steering control device for controlling a rear steering angle of the vehicle as generally indicated in FIG. 2.

In the common passage portion of the primary fluid passage 86, there is provided a proportioning valve 90 (abbreviated as "P/V" in FIG. 4). As well known in the art, the proportioning valve 90 is adapted to function as a pressure reducing valve when the pressure in the master cylinder 60 exceeds a predetermined threshold. Namely, when the pressure in the master cylinder 60 is lower than the predetermined threshold, the pressure as produced by the master cylinder 60 is applied through the proportioning valve 90 to the rear wheel brake cylinders 68. When the pressure in the master cylinder 60 is higher than the predetermined threshold, the pressure produced by the master cylinder 60 is reduced at a predetermined ratio, and the thus reduced pressure is applied to the rear wheel brake cylinders 68.

Between the proportioning valve 90 and the end of the common passage portion of the primary fluid passage 86 remote from the master cylinder 60, there is provided a master cylinder cut valve 92, which is a solenoid-operated directional control valve. This cut valve 92 is normally placed in a position for connecting the rear wheel brake cylinders 68 to the master cylinder 60. Upon operation of the yaw moment control braking device 102 or the traction control device, the cut valve 92 is brought to a position for disconnecting the rear wheel brake cylinders 68 from the master cylinder 60 and connecting these rear wheel brake cylinders 68 to a selector valve 94, which is a solenoid-operated directional control valve. The selector valve 94 is normally placed in a position for connecting the master cylinder cut valve 92 to the reservoir 80 through the brake booster 64. When the yaw moment control braking device 102 or the traction control device is activated, the selector valve 94 is brought to a position for disconnecting the master cylinder cut valve 92 from the reservoir 80 and connecting the master cylinder cut valve 92 to the electrically controlled hydraulic pressure source 82. When the yaw moment control braking device 102 is activated, therefore, the rear wheel brake cylinders 68 are operated by the hydraulic pressure supplied from the hydraulic pressure source 82.

In each of the two branch passage portions of the primary fluid passage 86, there is provided a pressure raising valve 72 which is a solenoid-operated pressure regulating valve in the form of a shut-off valve. Each rear wheel brake cylinder 68 is connected to the reservoir 80 through a pressure reducing valve 74, which is a solenoid-operated pressure regulating valve in the form of a shut-off valve.

The electrically controlled hydraulic pressure source 82 includes an accumulator 96 for storing a working fluid under pressure, and a pump 98 for pressurizing the fluid sucked up from the reservoir 80 and delivering the pressurized fluid into the accumulator 96. The pump 98 is controlled by a computer (not shown) so that the fluid pressure in the accumulator 96 is maintained within a predetermined range.

While there have been described the mechanical arrangements of the rear steering control device 100, front steering control device 104 and yaw moment control braking device 102, there will be described the electrical arrangements of these devices 100, 102, 104 and the vehicle parameter estimating device 106.

As shown in the block diagram of FIG. 4, the rear steering control device 100 includes a rear steering controller 120, which is principally constituted by a computer 122. The computer 122 incorporates a central processing unit (CPU) 124, a read-only memory (ROM) 126, and a random-access memory (RAM) 128. The rear steering controller 120 produces an output signal for controlling the rear steering actuator 44, and is adapted to receive various input signals. The input signals include output signals of a steering wheel angle sensor 130, a vehicle speed sensor 132, a yaw rate sensor 134 and a rear steering angle sensor 136. The steering wheel angle sensor 130 detects the angle θ of rotation of the steering wheel 14 by the vehicle operator. The vehicle speed sensor 132 detects the running speed V of the vehicle. The yaw rate sensor 134 detects the actual yaw rate γ of the vehicle. The input signals of the rear steering controller 120 further include output signals of the vehicle parameter estimating device 106 and yaw moment control braking device 102, which will be described.

Figure 5:
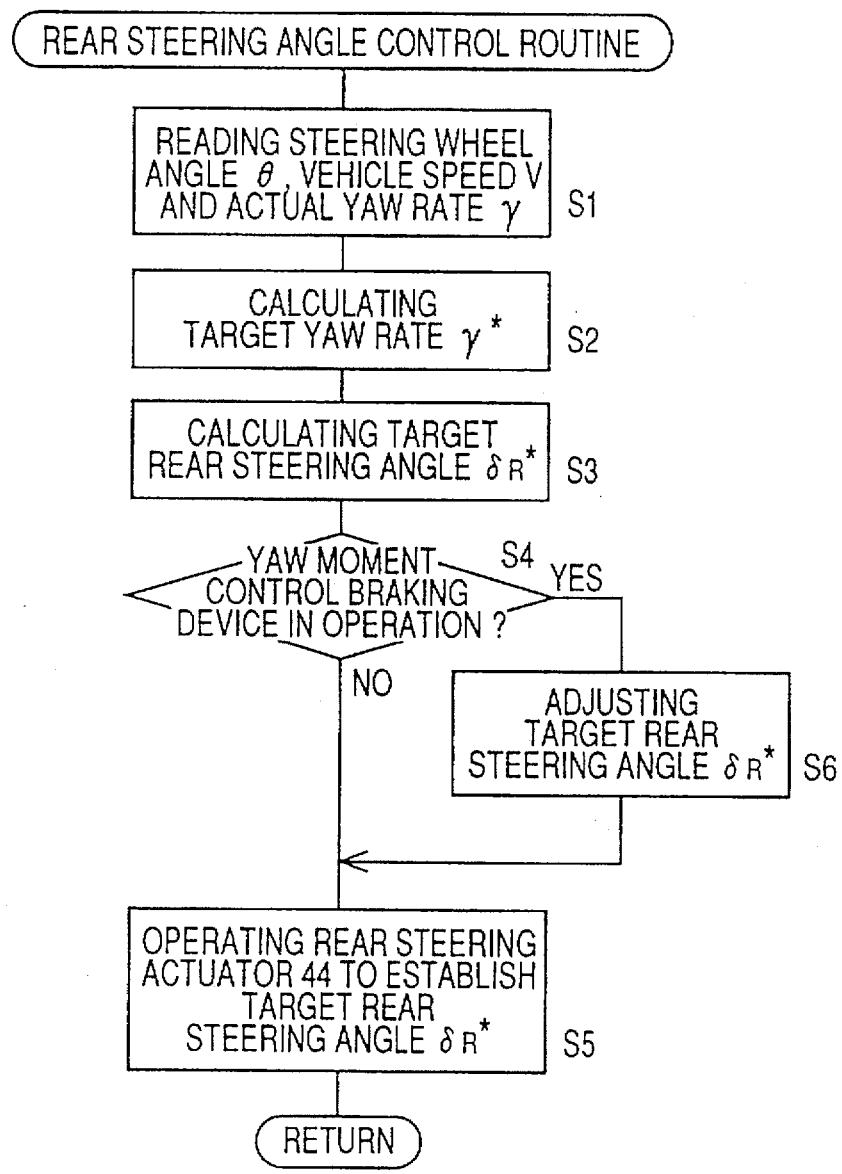
FIG. 5 is a flow chart illustrating a rear steering angle control routine executed according to a control program stored in a read-only memory of the rear steering control device of FIG. 4.

The ROM 126 of the rear steering controller 120 stores various control programs including a control program for executing a rear steering angle control routine illustrated in the flow chart of FIG. 5.

The rear steering angle control routine, which is repeatedly executed with a predetermined cycle time, is initiated with step S1 in which the computer 122 receives the output signals from the sensors 130, 132 and 134 representative of the steering wheel angle θ, vehicle speed V and yaw rate γ. Step S1 is followed by step S2 to calculate the target yaw rate γ* on the basis of the steering wheel angle θ and vehicle speed V. Then, the control flow goes to step S3 to calculate a target rear steering angle $\delta_{R*}$ suitable for establishing the target yaw rate γ* of the vehicle. Step S3 is followed by step S4 to determine whether the yaw moment control braking device 102 is in operation. If a negative decision (NO) is obtained in step S4, the control flow goes to step S5 in which the rear steering actuator 44 is operated to establish the target rear steering angle $\delta_{R*}$. Thus, one cycle of execution of the routine of FIG. 5 is completed. If the yaw moment control braking device 102 is in operation, namely, if an affirmative decision (YES) is obtained in step S4, the control flow goes to step S6 to adjust the target rear steering angle $\delta_{R*}$ which has been calculated in step S3. This step S6 is implemented as a target rear steering angle adjusting routine illustrated in the flow chart of FIG. 6, which will be described. Step S6 is followed by step S5 in which the rear steering actuator 44 is operated according to the adjusted target rear steering angle $\delta_{R*}$.

Figure 7:
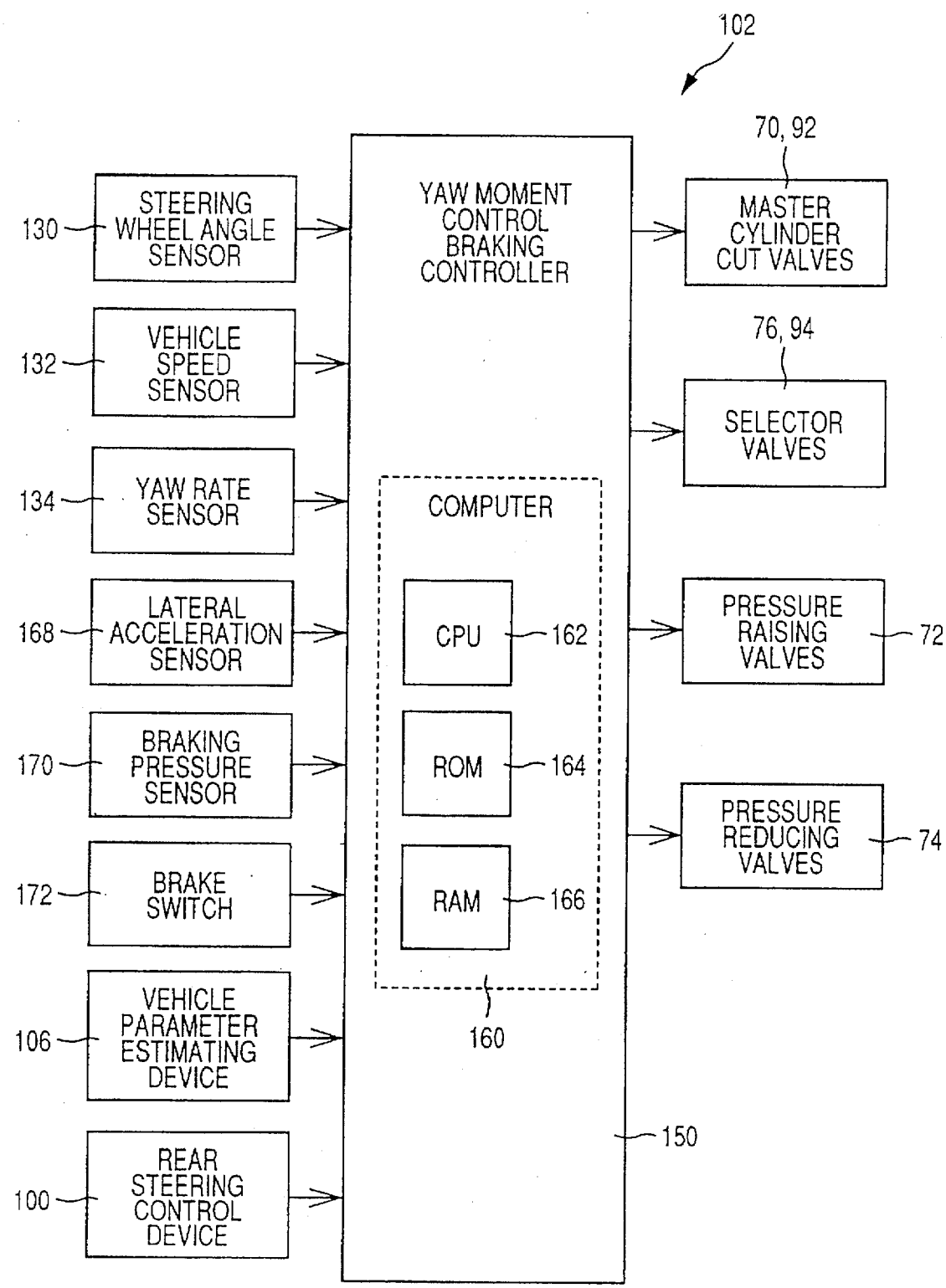
FIG. 7 is a block diagram showing an electrical control arrangement of the yaw moment control braking device.

As shown in the block diagram of FIG. 7, the yaw moment control braking device 102 includes a yaw moment control braking controller 150, which is principally constituted by a computer 160. The computer 160 incorporates a central processing unit (CPU) 162, a read-only memory (ROM) 164 and a random-access memory (RAM) 166. The yaw moment control braking controller 150 produces output signals for controlling the master cylinder cut valves 70, 92, selector valves 76, 94, and pressure raising and reducing valves 72, 74. The valves 70, 92, 76, 94, 72, 74 are considered to constitute a torque control actuator for changing the torque values of the wheels 10, 12. The controller 150 is adapted to receive various input signals. The input signals include the output signals of the steering wheel angle sensor 130, vehicle speed sensor 132 and yaw rate sensor 1134, which have been described above. The input signals further include output signals of a lateral acceleration sensor 168, a braking pressure sensor 170, and a brake switch 172. The lateral acceleration sensor 168 detects the lateral acceleration Gy of the vehicle at the center of gravity. The braking pressure sensor 170 detects fluid pressures P in the wheel brake cylinders 68 for the wheels 10, 12. The brake switch 172 detects an operation of the brake pedal 62 by the vehicle operator. The input signals of the controller 120 further include output signals of the vehicle parameter estimating device 106 and the rear steering control device 100.

Figure 8:
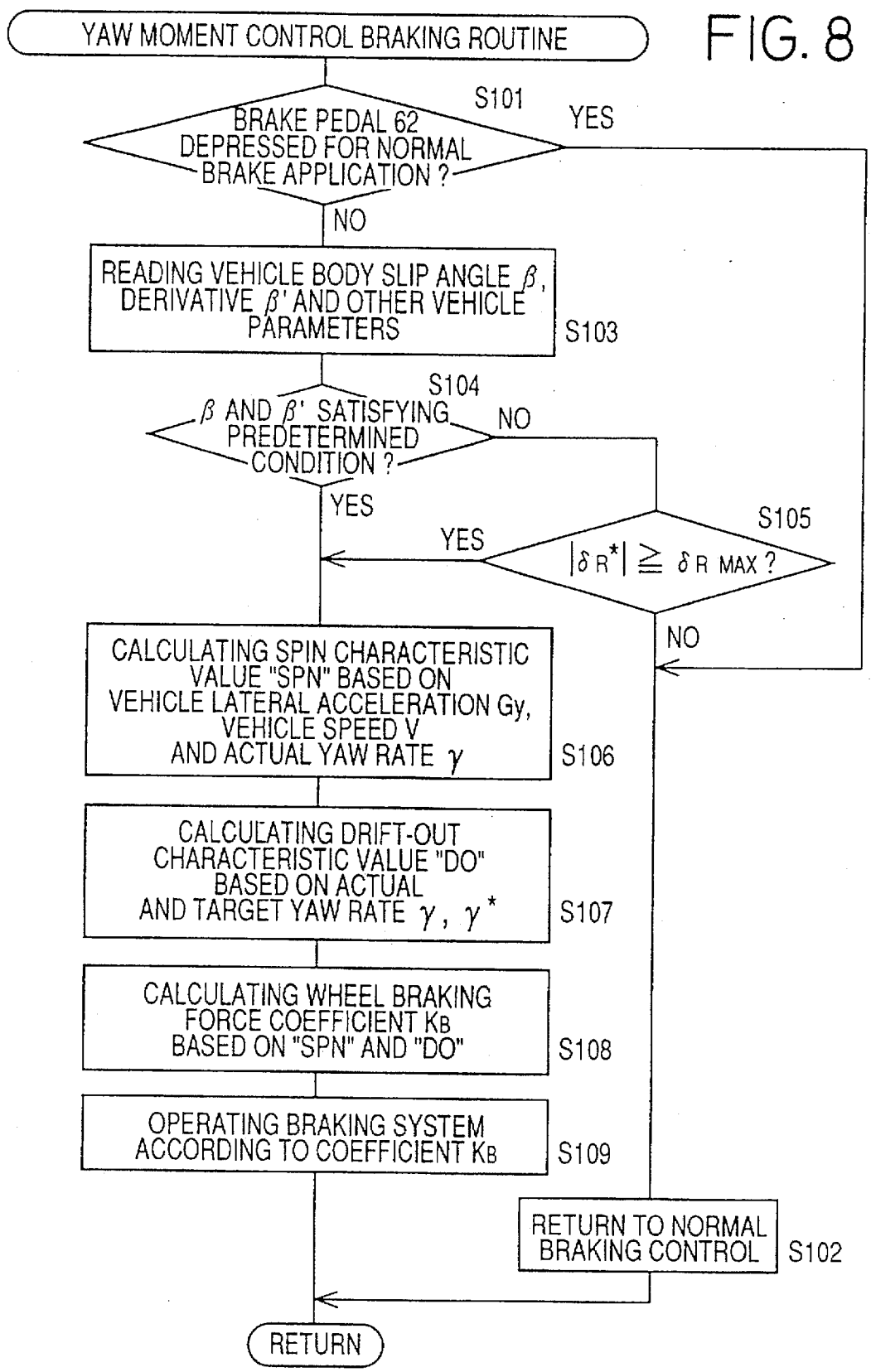
FIG. 8 is a flow chart illustrating a yaw moment control braking routine executed according to a control program stored in a read-only memory of the yaw moment control braking device of FIG. 7.

The ROM 164 of the computer 124 stores various control programs including a control program for executing a yaw moment control braking routine illustrated in -he flow chart of FIG. 8.

The yaw moment control braking routine, which is repeatedly executed with a predetermined cycle time, is initiated with step S101 to determine whether the brake pedal 62 has been depressed to apply normal brake to the vehicle. If an affirmative decision (YES) is obtained in step S101, the control flow goes to step S102 in which the braking system of FIG. 3 is commanded to apply normal brake to the vehicle. Thus, one cycle of execution of the routine of FIG. 8 is terminated. If the brake pedal 62 is not being depressed, namely, if a negative decision (NO) is obtained in step S101, the control flow goes to step S103.

In step S103, the computer 160 receives from the vehicle parameter estimating device 106 a signal representative of a slip angle β of the vehicle body, and a signal representative of a derivative β' of the slip angle β. The computer 160 also receives from the sensors 168, 132 and 134 the signals representative of the lateral acceleration Gy, running speed V and actual yaw rate γ of the vehicle. The computer 160 also receives the target yaw rate γ* from the rear steering control device 100.

Then, steps S104 and S105 are implemented to determine whether the vehicle attitude has been sufficiently corrected by the rear steering control device 100. This determination is effected to determine whether the yaw moment control braking device 102 should be operated to effect yaw moment control braking for further correcting the vehicle attitude. Described more specifically, step S104 is implemented to determine whether the slip angle β and its derivative β' satisfy a predetermined condition. In the present embodiment, this determination is effected to determine whether the absolute value of a sum of the values β and β' is larger than a predetermined threshold. The absolute value of the sum exceeding the threshold indicates that the yaw moment control braking device 102 should be operated to apply braking to the vehicle so as to control the yaw moment of the vehicle for correcting the vehicle attitude. If a negative decision (NO) is obtained in step S104, step S105 is implemented to determine whether the absolute value of the target rear steering angle $\delta_{k*}$ received from the rear steering control device 100 is equal to or larger than a predetermined upper limit $\delta_{RMAX}$. This determination is effected to determine whether the lateral tire forces are decreasing, that is, whether an operation of the rear steering control device 100 is no more effective enough to control the vehicle attitude. If an affirmative decision (YES) is obtained in step S105, it means that the yaw moment control braking device 102 should be operated. If a negative decision (NO) is obtained in step S105, the control flow goes to step S102 which has been described above.

If the absolute value of the sum β+β' has become larger than the predetermined threshold during repeated execution of the routine of FIG. 8, an affirmative decision (YES) is obtained in step S104, the control flow goes to step S106. Even while the negative decision (NO) is obtained in step S104, the control goes to step S106 if the target rear steering angle $\delta_{R*}$ has become equal to the upper limit $\delta_{RMAX}$.

In step S106, a spin characteristic value SPN indicative of a spinning tendency of the vehicle is calculated. The "spinning tendency" is a tendency of the vehicle to go inward away from the direction of a turn of the vehicle. For example, the spin characteristic value SPN may be represented by a lateral slip speed Vy of the vehicle. The lateral slip speed Vy may be calculated, for instance, by subtracting a product of the vehicle speed V and the actual yaw rate γ from the lateral vehicle acceleration Gy and differentiating the thus obtained difference (Gy−V·γ). Step S106 is followed by step S107 to calculate a drift-out characteristic value Do indicative of a drift-out tendency oft the vehicle. The "drift-out tendency" is a tendency of the vehicle to go outward away from the direction of the turn. For example, the drift-out characteristic value Do may be obtained as an error of the actual yaw rate γ with respect to the target yaw rate γ*. This error may be represented by a product of the actual yaw rate γ and a difference (γ*−γ).

Then, the control flow goes to step S108 to calculate a braking force coefficient $K_B$ for each wheel, on the basis of the calculated spin characteristic value SPN and drift-out characteristic value DO. The braking force that should be applied to each wheel is determined by the calculated braking force coefficient $K_B$. In the present embodiment, the yaw moment control braking device 102 is adapted to apply the yaw moment control brake to only one of the right and left wheels, such that the pressure P in the corresponding wheel brake cylinder 68 is controlled to a level determined by the braking force coefficient $K_B$ (determined by the characteristic values SPN and DO). Where the vehicle has the spinning tendency, the yaw moment control brake is applied to one of the right and left wheels which is located on the outer side of the turning direction of the vehicle. Where the vehicle has the drift-out tendency, the yaw moment control brake is applied to the wheel located on the inner side of the turning direction. Step S108 is followed by step S109 in which the braking system of FIG. 3 is operated so as to establish the braking force difference ΔB determined by the coefficient $K_B$. Thus, one cycle of execution of the routine of FIG. 8 is terminated. The controller 150 is considered to be a torque controller for controlling the torque values of the wheels 10, 12.

Where the right and left wheels are connected to each other through a differential mechanism, application of the yaw moment control brake to one of these two wheels results in application of a drive force to the other wheel. In this case, the braking system is activated so that the difference between the longitudinal forces acting on the right and left wheels coincides with the braking force difference ΔB determined by the coefficient $K_B$.

Figure 9:
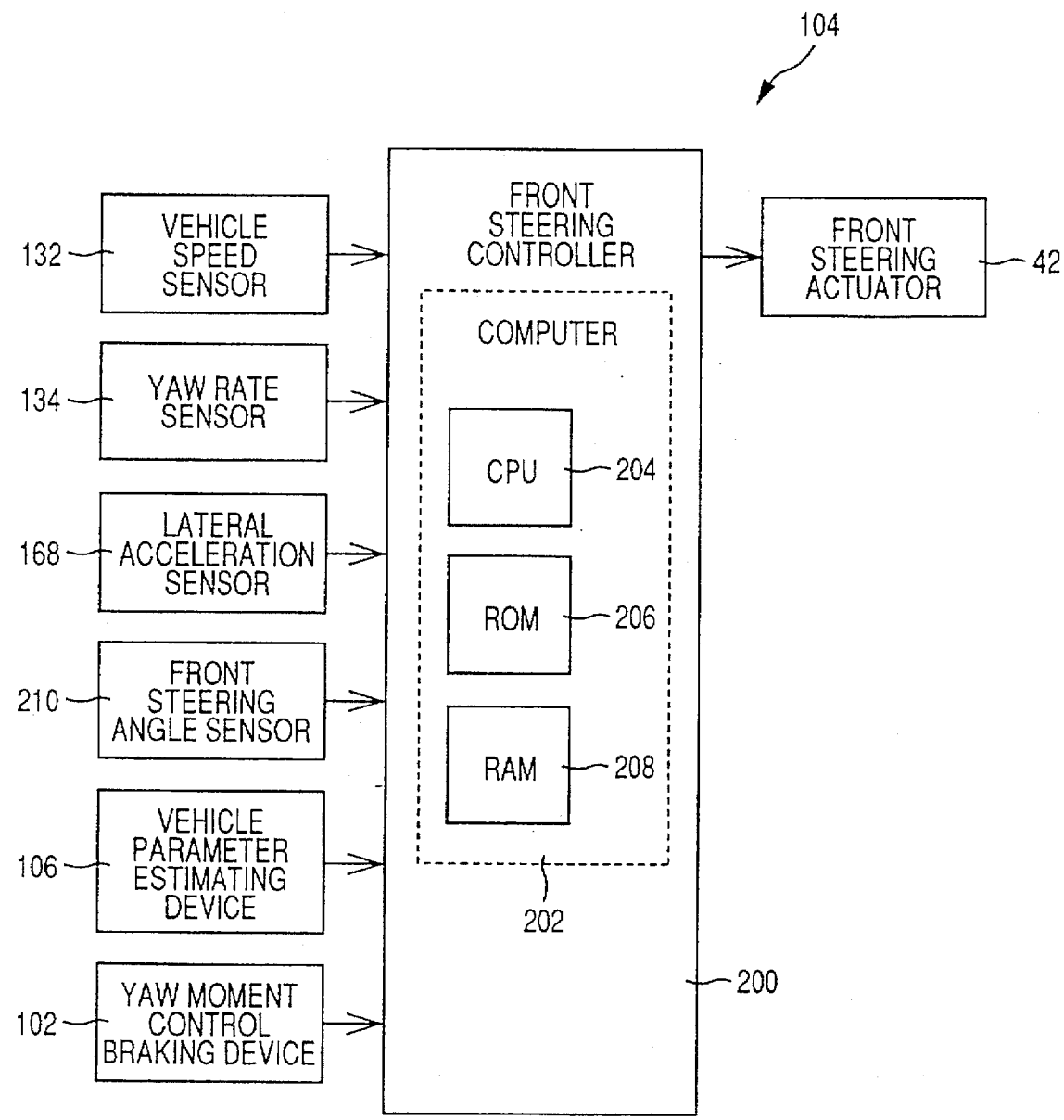
FIG. 9 is a block diagram showing an electrical control arrangement of a front steering control device for controlling a front steering angle of the vehicle as generally indicated in FIG. 2.

As shown in the block diagram of FIG. 9, the front steering control device 104 includes a front steering controller 200, which is principally constituted by a computer 202. The computer 202 incorporates a central processing unit (CPU) 204, a read-only memory (ROM) 206 and a random-access memory (RAM) 208. The controller 200 produces an output signal for controlling the front steering actuator 42. The controller 200 is adapted to receive input signals which includes output signals of the vehicle speed sensor 132, yaw rate sensor 134 and lateral acceleration sensor 168 which have been described. The input signals also include an output signal of a front steering angle sensor 210, which represents the front steering angle $\delta_F$. The sensor 210 detects the front steering angle $\delta_F$ by detecting the lateral position of the piston rod of the hydraulic cylinder 32. The right and left front wheels 10 are steered by not only the front steering control device 104 which is electrically controlled, by also the steering wheel 14 which is manually operated by the vehicle operator. The front steering angle $\delta_F$ is obtained as a sum of an automatic steering angle represented by the piston rod of the hydraulic cylinder 32, and a manual steering angle which is equal to N·θ, where N represents a steering gear ratio of the front steering mechanism, and θ represents the rotation angle of the steering wheel 14 as explained above. The front steering controller 200 also receives the output signals of the vehicle parameter estimating device 106 and the yaw moment control braking device 102.

The ROM 206 of the front steering controller 200 stores various control programs including a control program for executing a front steering angle control routine as illustrated in the flow chart of FIG. 10, which will be described later.

Figure 11:
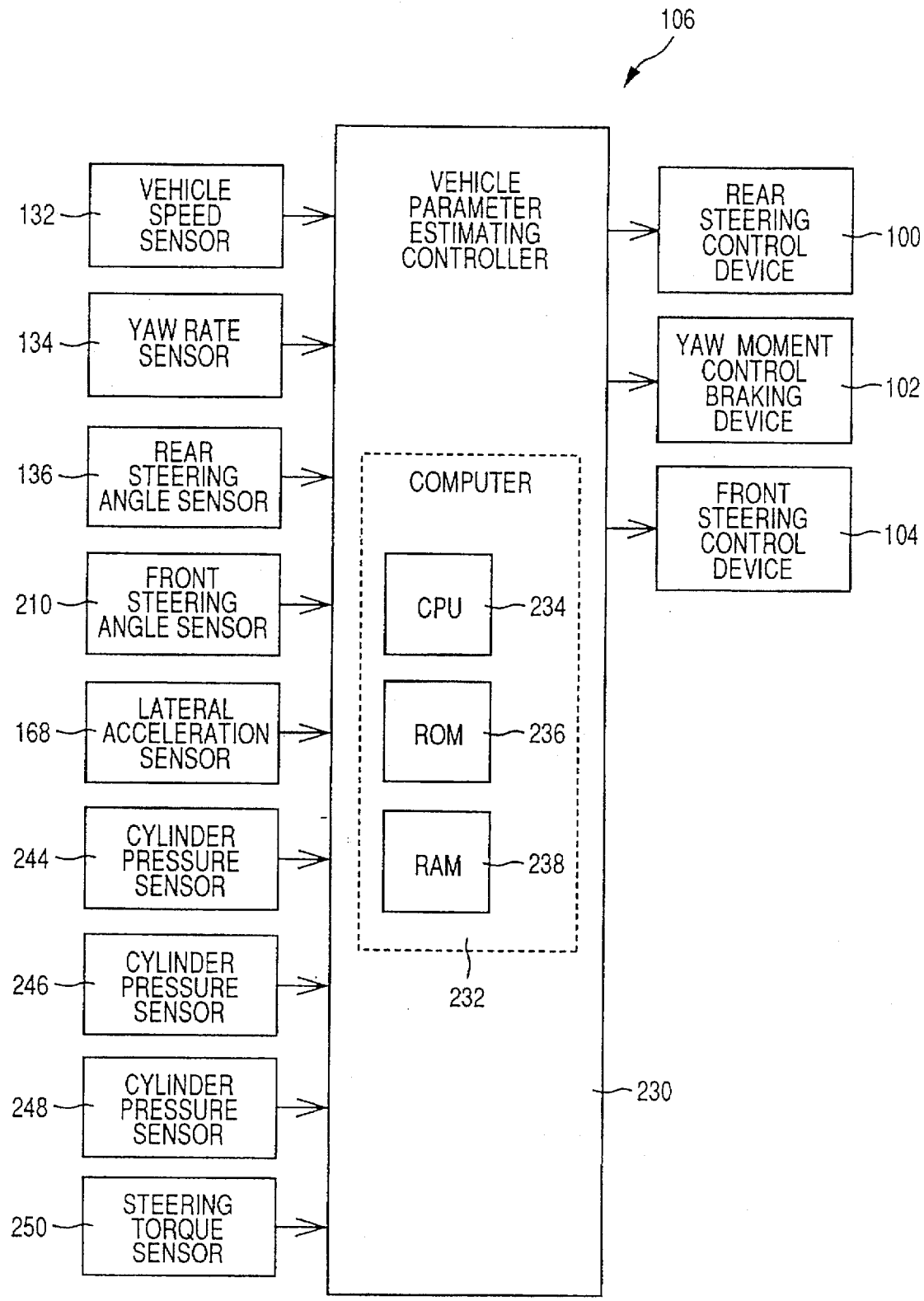
FIG. 11 is a block diagram showing a vehicle parameter estimating device for estimating vehicle parameters as generally indicated in FIG. 2.

As shown in the block diagram of FIG. 11, the vehicle parameter estimating device 106 includes a vehicle parameter estimating controller 230, which is principally constituted by a computer 232. This computer 232 incorporates a central processing unit (CPU) 234, a read-only memory (ROM) 236 and a random-access memory (RAM) 238. The controller 230 produces output signals for controlling the rear steering control device 100, yaw moment control braking device 102 and front steering control device 104. The controller 230 receives various input signals.

The input signals received by the controller 230 include the output signals of the vehicle sensor 132, yaw rate sensor 134, lateral acceleration sensor 168, and rear and front steering angle sensors 136, 210, which have been described. The input signals further include the output signals of cylinder pressure sensors 244, 246, 248 and the output signal of a steering torque sensor 250. The cylinder pressure sensor 244 detects pressures $P_R$ and $P_L$ in right and left chambers of the power cylinder 40 of the power steering mechanism 18 for the front wheels 10. The hydraulic pressure sensor 246 detects pressures $P_R$ and $P_L$ in right and left chambers of the hydraulic cylinder 32 for the front wheels 10, and the hydraulic pressure sensor 248 detects pressures $P_R$ and $P_L$ in right and left chambers of the hydraulic cylinder 34 for the front wheels 12. The steering torque sensor 250 detects a steering torque $T_{SW}$ which is applied from the vehicle operator to the steering wheel 14.

Figure 12:
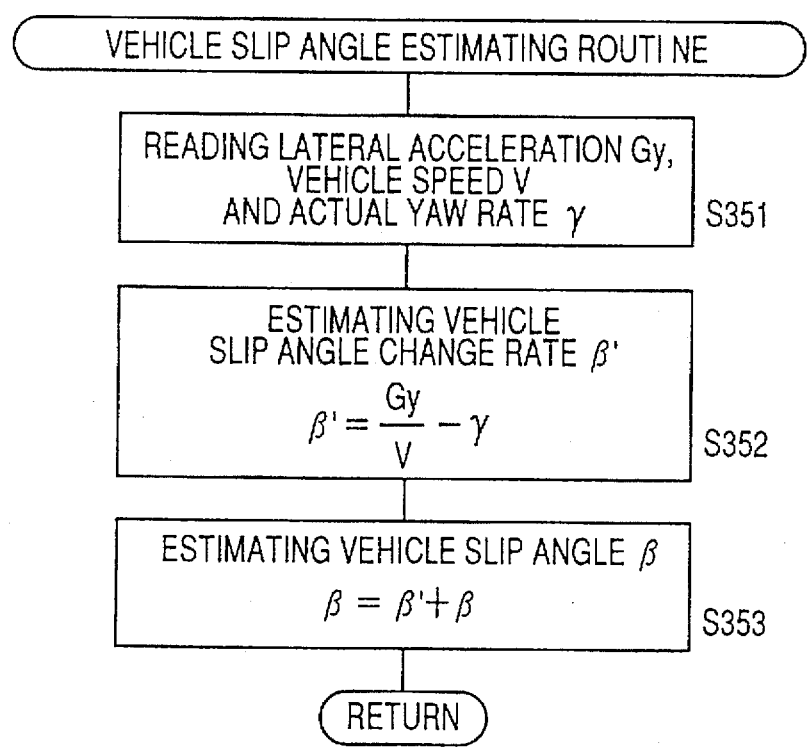
FIG. 12 is a flow chart illustrating a vehicle slip angle estimating routine executed according to a control program stored in a read-only memory of the vehicle parameter estimating device of FIG. 11.
Figure 13:
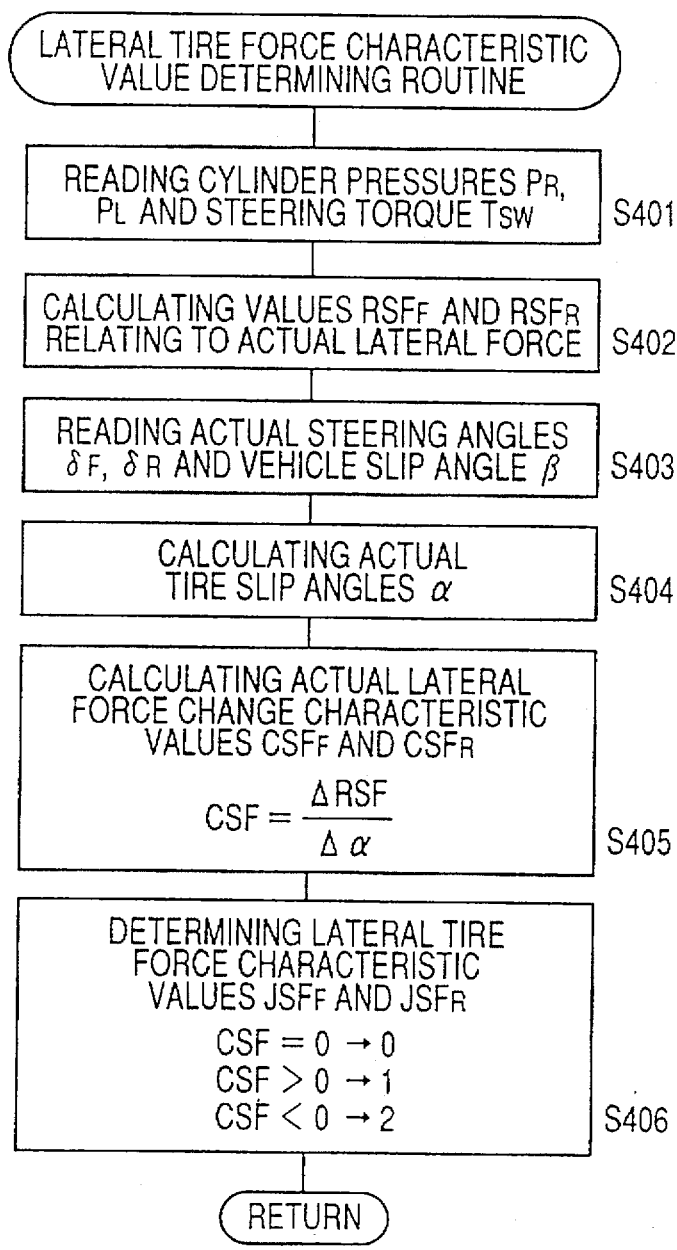
FIG. 13 is a flow chart illustrating a lateral tire force characteristic value determining routine executed according to a control program stored in a read-only memory of the vehicle parameter estimating device of FIG. 11.

The ROM 236 of the computer 232 stores various control programs including a vehicle slip angle estimating routine illustrated in the flow chart of FIG. 12, and a lateral tire force characteristic value determining routine illustrated in the flow chart of FIG. 13.

The vehicle slip angle estimating routine of FIG. 12 is formulated to calculate or estimate the rate of change β' of the vehicle slip angle β, according to the following equation (1):

$$\beta' = Gy/V - \gamma \qquad (1)$$

The value β' is a derivative of the vehicle slip angle β. Then, the vehicle slip angle β is estimated on the basis of the estimated value β'.

Described in detail, the vehicle slip angle estimating routine of FIG. 12 is initiated with step S351 to read the lateral acceleration Gy, running speed V and actual yaw rate γ of the vehicle. Step S351 is followed by step S352 to estimate the value β' according to the above equation (1), namely, by subtracting Gy/V from the actual yaw rate γ. Then, the control flow goes to step S353 to estimate the present value of the vehicle slip angle β by adding the estimated value β' to the last value of the vehicle slip angle β. The last value β was obtained in the last cycle of execution of the routine of FIG. 12. The estimated value β is stored in the RAM 238. Thus, one cycle of execution of the routine is terminated.

The lateral tire force characteristic value determining routine of FIG. 13 is formulated to obtain a lateral tire force characteristic value for the right and left front wheels 10 and for the right and left rear wheels 12. As is apparent from the following explanation, the lateral tire force characteristic value indicates one of three states of the wheels 10, 12, that is, a state in which the lateral tire force is increasing with an increase in the actual tire slip angle α, a state in which the lateral tire force is decreasing with the increase in the actual tire slip angle α, or a state in which the lateral tire force is held substantially constant or saturated irrespective of the increase in the tire slip angle α. In the lateral tire force characteristic value determining routine, the actual lateral forces SF acting on the wheels 10, 12 are not directly detected, but are estimated on the basis of an axial force which acts on the steering bar 36 or 38, since the axial force increases with an increase in the actual lateral force SF. Although this axial force on the steering bar 36, 38 can be directly detected by a strain gage or other detecting means, the present embodiment is adapted to estimate the axial force on the basis of a difference between the pressures $P_R$ and $P_L$ in the right and left chambers of the appropriate hydraulic cylinder 32, 34. Where the front and rear steering actuators 42, 44 are electrically driven by electric motors, the axial force on the steering bar 36, 38 may be indirectly detected on the basis of the current applied to energize the motor, or the duty ratio of the drive signal applied to the motor.

Described in detail, the lateral tire force characteristic value determining routine of FIG. 13 is initiated with step S401 to receive the output signals of the sensors 244, 246, 248, 250 representative of the pressures $P_R$, $P_L$ in the right and left chambers of each of the power cylinder 40 and hydraulic cylinders 32, 34 and the steering torque $T_{SW}$.

Step S401 is followed by step S402 to calculate a value RSF relating to the actual lateral force SF, for the front wheels 10 and for the rear wheels 12, on the basis of the above-indicated pressures $P_R$, $P_L$ and steering torque $T_{SW}$. For instance, the value $RSF_F$ for the front wheels 10 may be calculated according to the following equation (2), and the value $RSF_R$ for the rear wheels 12 may be calculated according to the following equation (3):

$$RSF_F = N \cdot T_{SW} + k1 \cdot (P_{FR} - P_{FL}) + k2 \cdot (P_{FR'} - P_{FL'}) \quad (2)$$

$$RSF_R = K3 \cdot (P_{RR} - P_{RL}) \quad (3)$$

where,

N: steering gear ratio (fixed value)

k1: product of the pressure-receiving area of the hydraulic cylinder 32 and the length of the corresponding knuckle arm k2: product of the pressure-receiving area of the power cylinder 40 and the length of the corresponding knuckle arm k3: product of the pressure-receiving area of the hydraulic cylinder 34 and the length of the corresponding knuckle arm $P_{FR}$: pressure in the right chamber of the hydraulic cylinder 32

$P_{FL}$: pressure in the left chamber of the hydraulic cylinder 32

$P_{FR'}$: pressure in the right chamber of the power cylinder 40

$P_{FL'}$: pressure in the left chamber of the power cylinder 40

$P_{RR}$: pressure in the right chamber of the hydraulic cylinder 34

$P_{RL}$: pressure in the left chamber of the hydraulic cylinder 34

In calculating the value RSF, it is desirable to take into account sliding resistance values f of the power and hydraulic cylinders 40, 32, 34. In this case, for example, the absolute value of the sliding resistance value f of the appropriate cylinder 40, 32, 34 is subtracted to the value RSF calculated according to the above equation (2) or (3) if the value RSF is a positive value, or added to the calculated value RSF if the value RSF is a negative value.

Then, the control flow goes to step S403 to read the actual steering angles $δ_F$, $δ_R$ of the front and rear wheels 10, 12 represented by the output signals of the front and rear steering angle sensors 210, 136, respectively, and also read the vehicle slip angle β which has been obtained in step S353 of the routine of FIG. 12 and stored in the RAM 238. Step S403 is followed by step S404 to calculate the actual tire slip angles $α_F$, $α_R$ of the front and rear wheels 10, 12. Described in detail, the actual front and rear tire slip angles $α_F$ and $α_R$ are calculated according to the following equations (4) and (5), respectively:

$$α_F = β + a \cdot γ/V - N \cdot θ - δ_F \quad (4)$$

$$α_R = β - b \cdot γ/V - δ_R \quad (5)$$

where, a: distance between the front axle and gravity center of the vehicle (fixed value)

b: distance between the rear axle and gravity center of the vehicle (fixed value)

N: steering gear ratio (fixed value) $δ_F$: front steering angle detected by the front steering angle sensor 210 (only the automatic steering angle) $δ_R$: rear steering angle detected by the rear steering angle sensor 136

Then, the control flow goes to step S405 to calculate an actual lateral force change characteristic value CSF for the front wheels 10 and for the rear wheels 12. This characteristic value CSF indicates a change of the actual lateral force SF in relation to the actual tire slip angle α. Described more specifically, the characteristic value $CSF_F$ for the front wheels 10 and the characteristic value $CSF_R$ for the rear wheels 12 are calculated according to the following equations (6) and (7), respectively:

$$CSF_F = ΔRSF_F / Δα_F \quad (6)$$

$$CSF_R = ΔRSF_R / Δα_R \quad (7)$$

where, $ΔRSF_F$: amount of change of the value $RSF_F$ $Δα_F$: amount of change of the actual front tire slip angle $α_F$.

$ΔRSF_R$: amount of change of the value $RSF_R$ $\Delta\alpha_R$: amount of change of the actual rear tire slip angle $\alpha_R$ Step S405 is followed by step s406 to determine a lateral front tire force characteristic value $JSF_F$ for the front wheels 10 and a lateral rear tire force characteristic value $JSF_R$ for the rear wheels 12. The value JSF is determined to be "0" when the value CSF is substantially zero, that is, when the lateral tire forces acting on the wheels 10, 12 are held substantially constant. The value JSF is determined to be "1" when the value CSF is a positive value, that is, when the lateral tire forces acting on the wheels are increasing. The value JSF is determined to be "2" when the value CSF is a negative value, that is, when the lateral tire forces acting on the wheels are decreasing. Thus, one cycle of execution of the routine of FIG. 13 is terminated.

Before describing in detail the target rear steering angle adjusting routine of FIG. 6 and the front steering angle control routine of FIG. 10, there will be described the background techniques applied to formulate these routines.

$B_{Rout}$: braking force acting on the outer rear wheel 12

The "inner" and "outer" wheels 10, 12 indicated above mean the wheels located on the inner and outer sides of the direction or path of turning of the vehicle.

Figure 14:
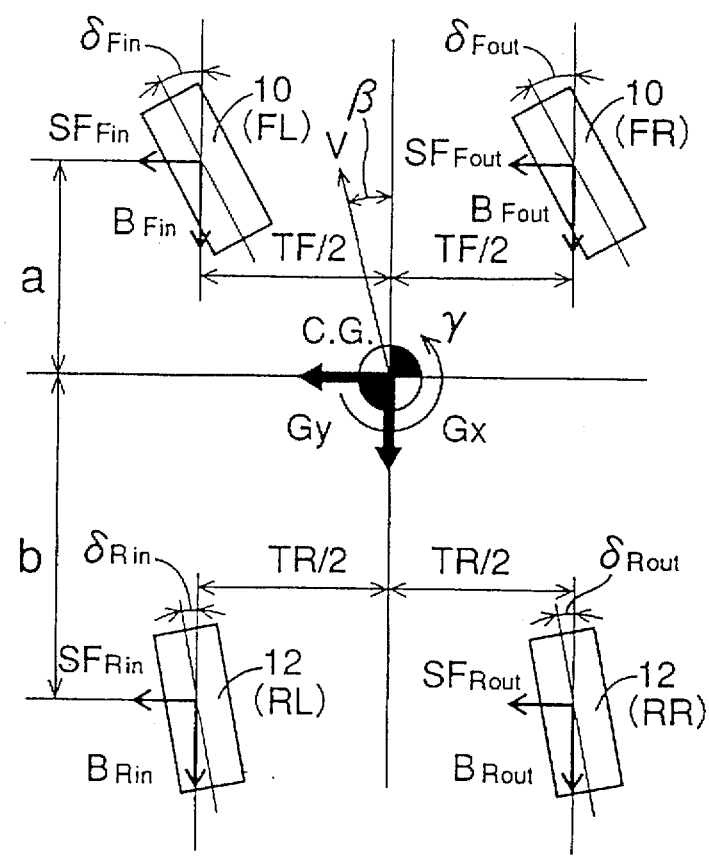
FIG. 14 is a plan view for explaining a relationship between lateral forces SF and braking forces B which act on the wheels of the vehicle while the vehicle is turning.
Figure 15A:
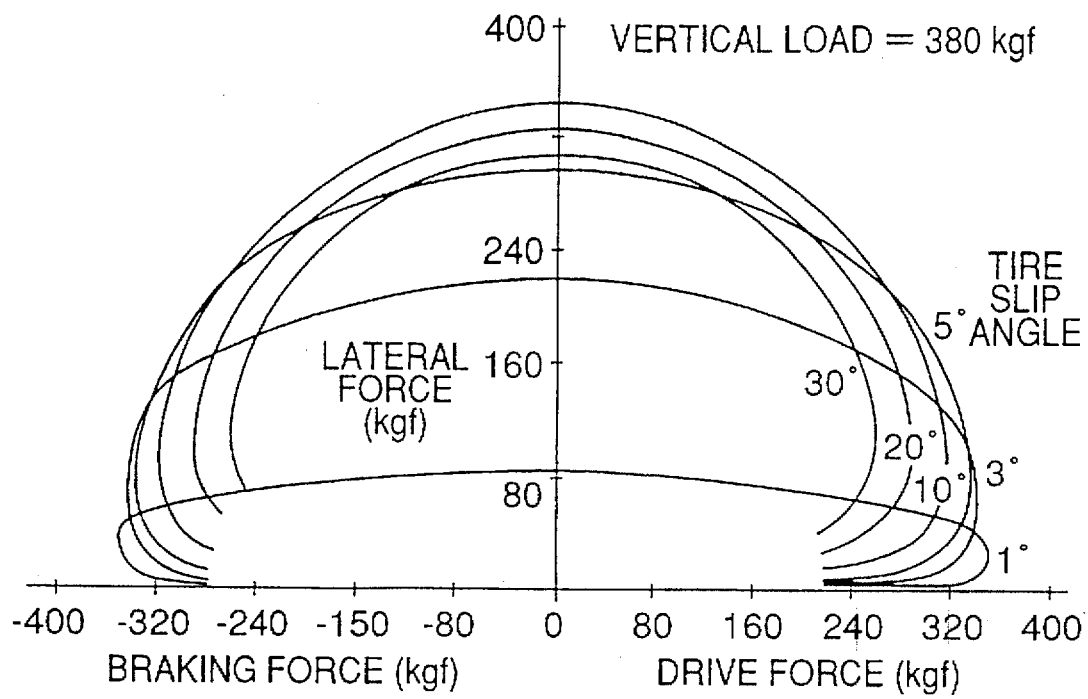
FIGS. 15(a) and 15(b) are graphs indicating relationships between the lateral and longitudinal forces acting on the wheels and slip ratio and slip angle of the wheel tires.
Figure 15B:
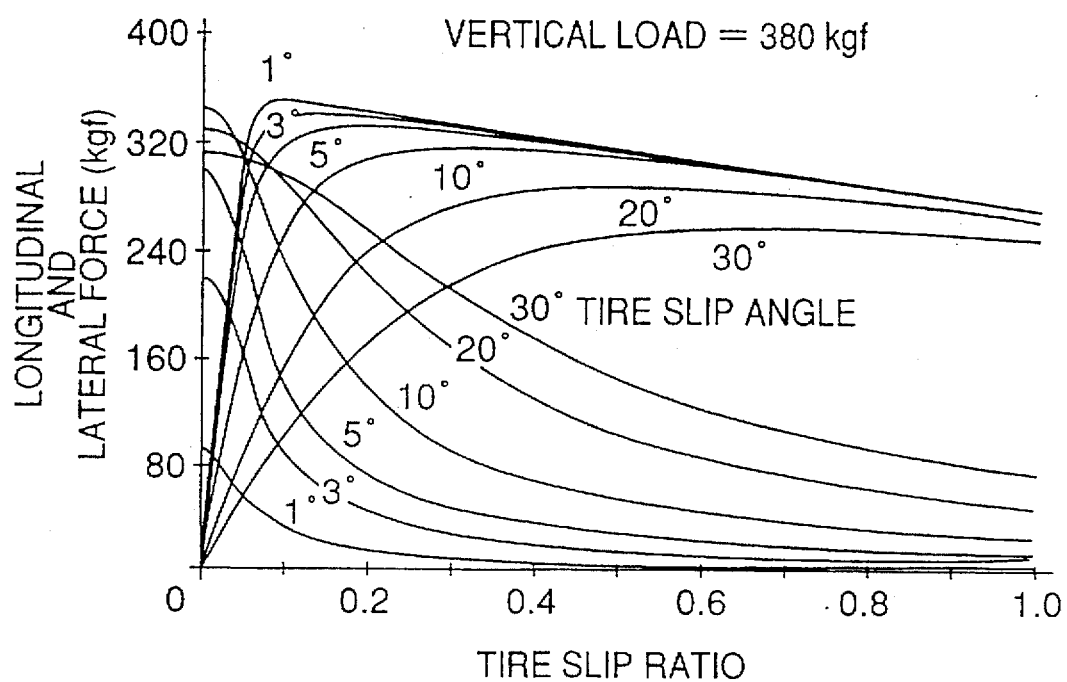

If the vehicle spins inward away from the turning direction for some reason or other, a counter moment that should be applied to the vehicle to reduce the spinning tendency is in the clockwise direction as seen in FIG. 14. To maximize this counter moment, both of the lateral and braking forces acting on the inner front wheel should be decreased, while the lateral and braking forces on the inner rear wheel should be increased and decreased, respectively, as indicated in TABLE 1. Further, the lateral and braking forces acting on the outer front wheel should be decreased and increased, respectively, while both of the lateral and braking forces on the outer rear wheel should be increased, as also indicated in TABLE 1.

TABLE 1

|  |  | Spin Reducing Counter Moment | | Drift-out Reducing Counter Moment | |
| --- | --- | --- | --- | --- | --- |
|  |  | Inner | Outer | Inner | Outer |
| Front Wheels | Lateral Force | DECREASE | DECREASE | INCREASE | INCREASE |
|  | Braking Force | DECREASE | INCREASE | INCREASE | DECREASE |
| Rear Wheels | Lateral Force | INCREASE | INCREASE | DECREASE | DECREASE |
|  | Braking Force | DECREASE | INCREASE | INCREASE | DECREASE |

Referring to FIG. 14, there are indicated lateral forces SF and braking forces B acting on each of the wheels 10, 12 while the vehicle is turning in a counterclockwise direction as seen in the figure. Legends used in FIG. 14 have the following meanings:

C.G.: center of gravity of the vehicle
γ: yaw rate of the vehicle (positive when the yaw is in the counterclockwise direction)
Gx: longitudinal acceleration of the vehicle (positive for the rearward acceleration)
Gy: lateral acceleration of the vehicle (positive for the leftward acceleration)
TF: front tread of the vehicle
TR: rear tread of the vehicle
a: distance between the front axle and gravity center
b: distance between the rear axle and gravity center
$\delta_{Fin}$: steering angle of the inner front wheel 10 (positive when the angle is taken counterclockwise)
$\delta_{Fout}$: steering angle of the outer front wheel 10
$\delta_{Rin}$: steering angle of the inner rear wheel 12
$\delta_{Rout}$: steering angle of the outer rear wheel 12
$SF_{Fin}$: lateral force acting on the inner front wheel 10 (positive when the force acts in the leftward direction)
$SF_{Fout}$: lateral force acting on the outer front wheel 10
$SF_{Rin}$: lateral force acting on the inner rear wheel 12
$SF_{Rout}$: lateral force acting on the outer rear wheel 12
$B_{Fin}$: braking force acting on the inner front wheel 10 (positive when the force acts in the rearward direction)
$B_{Fout}$: braking force acting on the outer front wheel 10
$B_{Rin}$: braking force acting on the inner rear wheel 12

If the vehicle drifts in or spins outward away from the turning direction for some reason or other, a counter moment that should be applied to the vehicle to reduce the drift-out tendency is in the counterclockwise direction as seen in FIG. 14. To maximize this counter moment, both of the lateral and braking forces acting on the inner front wheel should be increased, while the lateral and braking forces on the inner rear wheel should be decreased and increased, respectively, as indicated in TABLE 1. Further, the lateral and braking forces acting on the outer front wheel should be increased and decreased, respectively, while both of the lateral and braking forces on the outer rear wheel should be decreased, as also indicated in TABLE 1. That is, the increasing and decreasing directions of the 15 lateral and braking forces to produce the required counter moment to reduce the drift-out behavior of the vehicle are opposite to those to produce the required counter moment to reduce the spinning behavior.

If the tire slip angle of a given wheel is increased or decreased where the rear steering control device 100 and the yaw moment control braking device 102 are concurrently operated, the maximum values of the lateral and braking forces acting on the wheel change as indicated in the graphs of FIG. 16 and as indicated in TABLE 2.

TABLE 2

Lateral Tire Force Characteristics

|  | Increasing Range | | Decreasing Range | |
|---|---|---|---|---|
| Tire slip Angle | INCREASE | DECREASE | INCREASE | DECREASE |
| Max. Lateral Force | INCREASE | DECREASE | DECREASE | INCREASE |
| Max. Braking Force | DECREASE | INCREASE | DECREASE | INCREASE |

The maximum value of the braking force does not change depending upon whether the lateral tire force is increasing or decreasing with an increase in the tire slip angle, but does change depending upon whether the tire slip angle has an increasing tendency or a decreasing tendency. Namely, the maximum braking force decreases when the tire slip angle is increasing and decreases when it is decreasing. Thus, the direction of change of the maximum braking force is opposite to the direction of change of the tire slip angle.

On the other hand the maximum value of the lateral force changes depending upon whether the lateral tire force is increasing or decreasing (whether the lateral tire force is in an increasing or a decreasing range). Described more specifically, while the lateral tire Force is in the increasing range, the maximum lateral force tends to increase with an increase in the tire slip angle and tends to decrease with a decrease in the tire slip angle. While the lateral tire force is in the decreasing range, the maximum lateral force tends to decrease with an increase in the tire slip angle and tends to increase with a decrease in the tire slip angle.

TABLE 2 and the graphs of FIG. 16 indicate the maximum values of the lateral and braking forces independently of each other, but do not indicate those maximum values when the lateral and braking forces are simultaneously generated. That is, the braking force is substantially zeroed when the lateral force is maximum, and the lateral force is substantially zeroed when the braking force is maximum. In this respect, it is noted that a friction force acting on a given wheel is broken down into the lateral force and the braking force, namely, the lateral and longitudinal forces. The graphs of FIG. 16 also show how these lateral and longitudinal forces change up to the maximum values as the tire slip angle changes. In other words, the graphs of FIG. 16 show, for example, that an increase in the tire slip angle causes a decrease in the actual lateral force and an increase in the actual braking force, if the lateral and braking forces are concurrently generated in a condition wherein the lateral tire force is in the increasing range.

TABLES 1 and 2 taken in combination indicate the direction of change of the tire slip angle a necessary to effectively reduce the spinning or drift-out tendency of the vehicle, in relation to the direction of change of the lateral tire force. TABLE 3-1 indicates such directions of change of the tire slip angle for the front wheels 10 to reduce the spinning tendency of the vehicle, while TABLE 3-2 indicates such directions for the front wheels 10 to reduce the drift-out tendency of the vehicle. Similarly, TABLE 4-1 and TABLE 4-2 indicate such directions of change of the tire slip angle for the rear wheels 12 to reduce the spinning and drift-out tendencies, respectively.

TABLE 3-1

To reduce Spinning Tendency

|  | Inner Front Wheel | | Outer Front Wheel | |
|---|---|---|---|---|
| Lateral Tire Force | INCREASE | DECREASE | INCREASE | DECREASE |
| Direction of Change of Tire Slip Angle α | 0 | INCREASE | DECREASE | 0 |

TABLE 3-2

To reduce Drift-out Tendency

|  | Inner Front Wheel | | Outer Front Wheel | |
|---|---|---|---|---|
| Lateral Tire Force | INCREASE | DECREASE | INCREASE | DECREASE |
| Direction of Change of Tire Slip Angle α | 0 | DECREASE | INCREASE | 0 |

TABLE 4-1

To reduce Spinning Tendency

|  | Inner Rear Wheel | | Outer Rear Wheel | |
|---|---|---|---|---|
| Lateral Tire Force | INCREASE | DECREASE | INCREASE | DECREASE |
| Direction of Change of Tire Slip Angle α | INCREASE | 0 | 0 | DECREASE |

TABLE 4-2

To reduce Drift-out Tendency

|  | Inner Front Wheel | | Outer Front Wheel | |
|---|---|---|---|---|
| Lateral Tire Force | INCREASE | DECREASE | INCREASE | DECREASE |
| Direction of Change of Tire Slip Angle α | DECREASE | 0 | 0 | INCREASE |

To effectively reduce the spinning tendency of the vehicle, it is required to reduce both the lateral force SF and the braking force B for the inner front wheel, and is therefore desirable to increase the tire slip angle a of the inner front wheel when the lateral tire force is in the decreasing range. Further, it is required to reduce the lateral force SF and increase the braking force B for the outer front wheel and is therefore desirable to reduce the tire slip angle α of the outer front wheel when the lateral tire force is in the increasing range. For the inner rear wheel, it is required to increase the lateral force SF and decrease the braking force B and is therefore desirable to increase the tire slip angle α when the lateral tire force is in the increasing range. For the outer rear wheel, it is required to increase both the lateral force SF and the braking force B and is therefore desirable to reduce the tire slip angle α when the lateral tire force is in the decreasing range.

To effectively reduce the drift-out tendency of the vehicle, on the other hand, it is required to increase both the lateral force SF and the braking force B for the inner front wheel, and is therefore desirable to decrease the tire slip angle α of the inner front wheel when the lateral tire force is in the decreasing range. Further, it is required to increase the lateral force SF and decrease the braking force B for the outer front wheel and is therefore desirable to increase the tire slip angle α of the outer front wheel when the lateral tire force is in the increasing range. For the inner rear wheel, it is required to decrease the lateral force SF and increase the braking force B and is therefore desirable to reduce the tire slip angle α when the lateral tire force is in the increasing range. For the outer rear wheel, it is required to decrease both the lateral force SF and the braking force B and is therefore desirable to increase the tire slip angle α when the lateral tire force is in the decreasing range.

Figure 6:
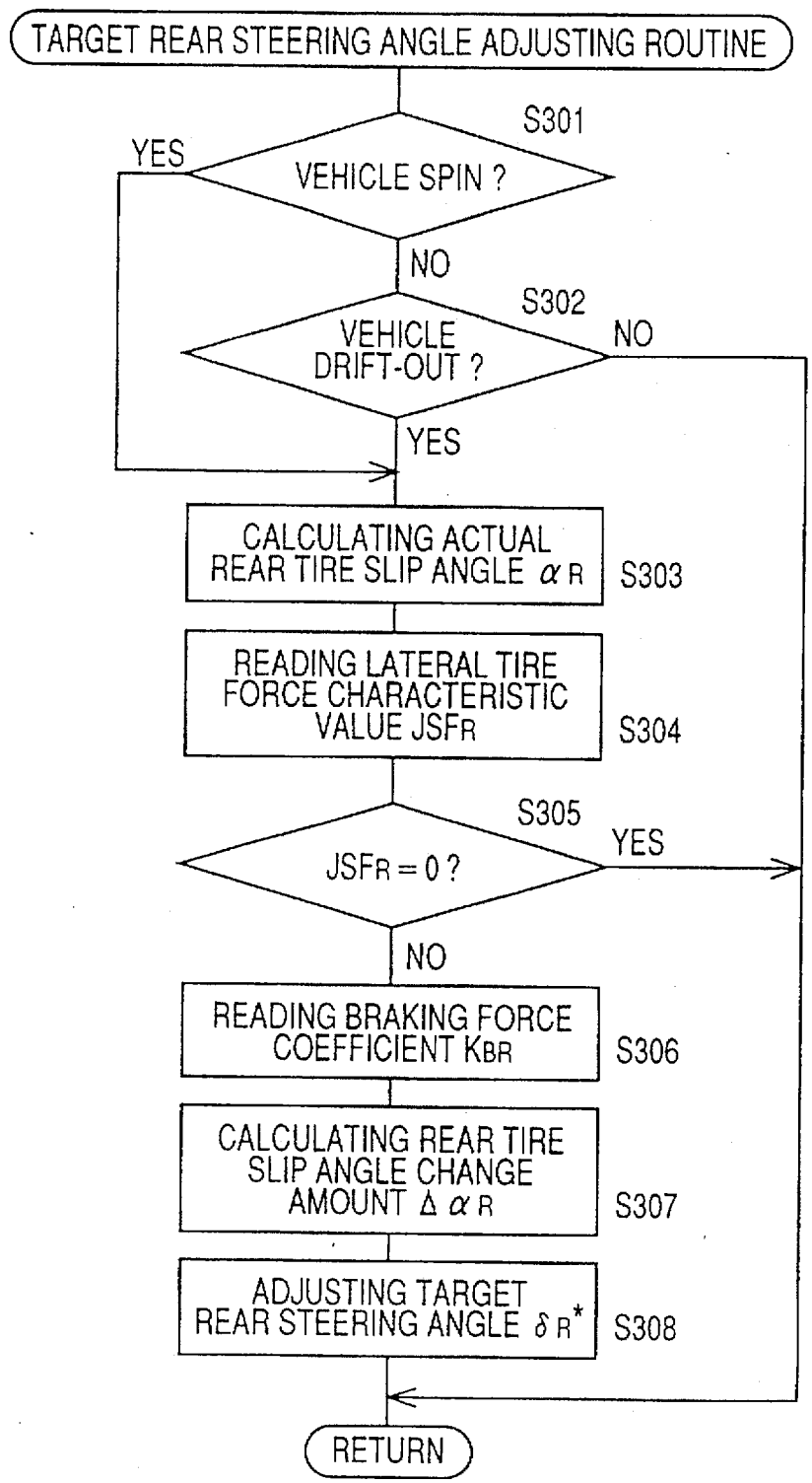
FIG. 6 is a flow chart illustrating a target rear steering angle adjusting routine executed in step S6 of the routine of FIG. 5.
Figure 10:
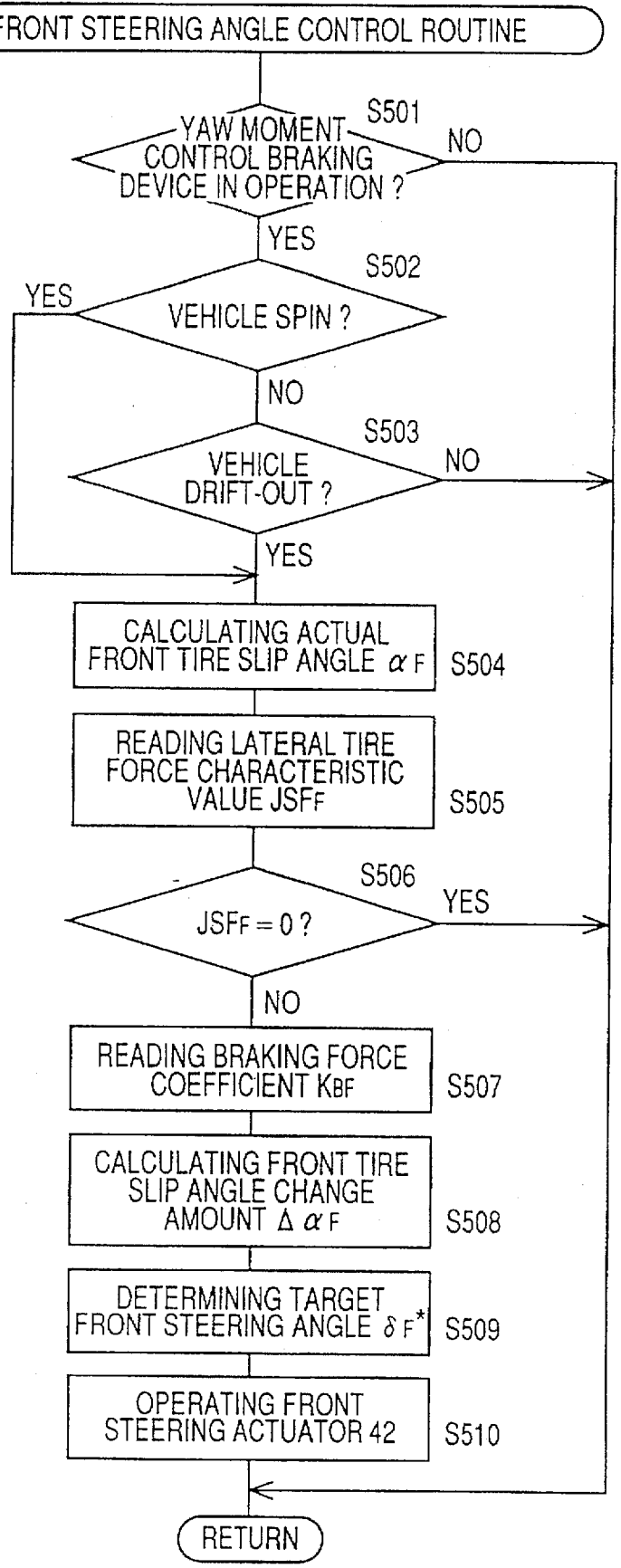
FIG. 10 is a flow chart illustrating a front steering angle control routine executed according to a control program stored in a read-only memory of the front steering control device of FIG. 9.

The target rear steering angle adjusting routine of FIG. 6 and the front steering angle control routine of FIG. 10 are formulated in view of the above facts. The routine of FIG. 6 will be described in detail.

The target rear steering angle adjusting routine of FIG. 6 is repeatedly executed alternately for the right and left rear wheels 12. This routine is initiated with step S301 to determine whether the vehicle has a spinning tendency. This determination is effected by determining whether either one of the following conditions (a) and (b) is satisfied. Namely, the vehicle is considered to have a spinning tendency if one of these conditions is satisfied.

(a) $\gamma \geq 0$, and $\gamma - Gy/V \geq THA$ (>0)

where, THA: positive threshold (b) $\gamma < 0$, and $\gamma - Gy/V \geq THB$ (<0)

where, THB: negative threshold If a negative decision (NO) is obtained in step S301, the control flow goes to step S302 to determine whether the vehicle has a drift-out tendency. This determination is effected by determining whether the following equation is satisfied. Namely, the vehicle is considered to have a drift-out tendency if this equation is satisfied.

$\gamma \cdot (\gamma^* - \gamma) > 0$

If a negative decision (NO) is obtained in step S302, one cycle of execution of the routine of FIG. 6 is terminated.

If an affirmative decision (YES) is obtained in step S301 or S302, the control flow goes to step S303 to calculate the actual rear tire slip angle $\alpha_R$ on the basis of the vehicle slip angle β and the steering angle $\delta_R$ of the rear wheel 12 in question. Step S303 is followed by step S304 to read the lateral tire force characteristic value $JSF_R$ received from the vehicle parameter estimating device 106. Then, the control flow goes to step S305 to determine whether the value $JSF_R$ is zero. When the value $JSF_R$ is zero, it means that the lateral tire force of the rear wheel 12 in question is substantially held constant or saturated, namely, neither increasing nor decreasing. If an affirmative decision (YES) is obtained in step S305, one cycle of execution of the routine is terminated.

If the lateral tire force of the rear wheel 12 in question is in the increasing or decreasing range, a negative decision (NO) is obtained in step S305. In this case, the control flow goes to step S306 to read the braking force coefficient $K_{BR}$ of the appropriate rear wheel received from the yaw moment control braking device 102. Step S306 is followed by step S307 to calculate an amount of change $\Delta\alpha_R$ of the tire slip angle $\alpha_R$ of the appropriate rear wheel, on the basis of the lateral tire force characteristic value $JSF_R$ and braking force coefficient $K_{BR}$, and depending upon whether the appropriate rear wheel is the inner or outer wheel with respect to the turning direction of the vehicle.

The amount of change $\Delta\alpha_R$ is calculated in the following manner.

Initially, the sign (positive or negative) of the amount of change $\Delta\alpha_R$ is determined depending upon whether the rear wheel in question is the inner or outer rear wheel, and on the basis of the characteristic value $JSF_R$. That is, if the tire slip angle a should be increased as indicated by "INCREASE" in the lowermost row of TABLES 4-1 and 4-2, the sign of the value $\Delta\alpha_R$ is determined to be positive. If the tire slip angle α should be decreased as indicated by "DECREASE" in the lowermost row of those tables, the sign is determined to be negative. The value $\Delta\alpha_R$ is determined to be zero where the tire slip angle α should remain unchanged as indicated by "0" in the lowermost row of the above tables. Then, the absolute value of the amount of change $\Delta\alpha_R$ is determined so as to increase with an increase in the braking force coefficient $K_{BR}$, that is, with an increase in the braking force difference $\Delta B$ to be established by the yaw moment control braking device 102. This determination is effected according to a functional equation or data table representative of a predetermined relationship between the absolute value of the change amount $\Delta\alpha_R$ and the braking force coefficient $K_{BR}$. The functional equation or data table is stored in the ROM 126 of the rear steering control device 100.

Then, the control flow goes to step S308 to adjust the target rear steering angle $\delta_{R*}$ which has been calculated in step S3 of the rear steering angle control routine of FIG. 5 and stored in the RAM 128. More specifically, the target rear steering angle $\delta_{R*}$ is adjusted so that the tire slip angle $\alpha_R$ of the appropriate rear wheel is changed by the change amount $\Delta\alpha_R$ calculated in step S307. Thus, one cycle of execution of the routine of FIG. 6 (step S6 of the routine of FIG. 5) is terminated.

Referring to the flow chart of FIG. 10, the front steering angle control routine will be described in detail.

The routine of FIG. 10 is repeatedly executed alternately for the right and left front wheels 10. The routine is initiated with step S501 to determine whether the yaw moment control braking device 102 is in operation to apply the yaw moment control brake to any one oil the four wheels 10, 12. If a negative decision (NO) is obtained in step S501, one cycle of execution of the routine is terminated. If an affirmative decision (YES) is obtained in step S501, the control flow goes to step S502.

Step S502 is implemented to determine whether the vehicle has a spinning tendency, in the same manner as in step S301 described above. If a negative decision (NO) is obtained in step S502, the control flow goes to step S503 to determine whether the vehicle has a drift-out tendency, in the same manner as in step S302 described above. If the negative decision (NO) is obtained in both of these steps S502 and S503, one cycle of execution of the routine of FIG. 10 is terminated. If an affirmative decision (YES) is obtained in either one of the steps S502 and S503, the control flow goes to step S504.

Step 504 is implemented to calculate the actual tire slip angle $\alpha_F$ of the front wheel 10 in question, on the basis of the vehicle slip angle α and the actual steering angle $\delta_F$ of the appropriate front wheel 10. Step S504 is followed by step S505 to read the lateral tire force characteristic value $JSF_F$ of the appropriate front wheel received from the vehicle parameter estimating device 106. Then, the control flow goes to step S506 to determine whether the characteristic value $JSF_F$ is zero. When the value $JSF_F$ is zero, means that the lateral tire force of the appropriate front wheel 10 is substantially held constant or saturated, namely, neither increasing nor decreasing. If an affirmative decision (YES) is obtained in step S305, one cycle of execution of the routine is terminated.

If the lateral tire force of the front wheel 10 in question is in the increasing or decreasing range, a negative decision (NO) is obtained in step S506. In this case, the control flow goes to step S507 to read the braking force coefficient $K_{BF}$ of the appropriate front wheel received from the yaw moment control braking device 102. Step S507 is followed by step S508 to calculate an amount of change $\Delta\alpha_F$ of the tire slip angle $\alpha_F$ of the appropriate front wheel, on the basis of the lateral tire force characteristic value $JSF_F$ and braking force coefficient $K_{BF}$, and depending upon whether the appropriate front wheel is the inner or outer wheel with respect to the turning direction of the vehicle. The calculation in step S508 is effected in a manner similar to that in step S307 for the amount of change $\Delta\alpha_F$. Then, step S509 is implemented to determine the calculated amount of change $\Delta\alpha_F$ as the target front steering angle $\delta_{F*}$. Step S509 is followed by step S510 to operate the front steering actuator 42 so as to establish the target front steering angle $\delta_{F*}$. Thus, one cycle of execution of the front steering angle control routine of FIG. 10 is terminated.

In the present embodiment, the rear steering angle $\delta_R$ is always controlled by the rear steering control device 100, but the yaw moment control brake is applied to the vehicle by the yaw moment control braking device 102 only when an abnormal attitude or behavior (spinning or drift-out tendency) of the vehicle is not sufficiently corrected by the operation of the rear steering control device 100. Accordingly, the control load of the yaw moment control braking device 102 is smaller than that of a yaw moment control braking device in a vehicle attitude control apparatus adapted to effect concurrent operations of the rear steering control device and the yaw moment control braking device. Consequently, the wheel brakes have prolonged life expectancy, with reduced amounts of wear of brake pads, for example.

Further, the present embodiment is adapted such that the tire slip angle is reduced toward zero if the yaw moment control braking device is in operation, so that the maximum value of the braking force acting on each wheel is increased, and the effect of the yaw moment control brake applied by the yaw moment control braking device is increased. In addition, the yaw moment control brake application results in automatic deceleration of the vehicle in the longitudinal direction of the vehicle. In other words, the yaw moment control braking device is capable of not only generating a yaw moment to control the vehicle attitude, but also effecting longitudinal deceleration of the vehicle, which is also effective to correct the abnormal attitude or behavior of the vehicle.

In the present embodiment, the braking system is controlled by the traction control device or anti-lock control device if the amount of operation of the accelerator pedal or brake pedal is excessively large in relation to the coefficient of friction between the tire and the road surface. The traction and anti-lock control devices are arranged to control the actual slip ratio of the wheels so as to maximize the lateral forces acting on the wheels, so that the traction and anti-lock control devices cooperate with the rear steering control device 100 and the yaw moment control braking device 102 to more effectively control the vehicle attitude in a coordinated fashion.

It will be understood from the foregoing description of the present embodiment that a portion of the rear steering controller 120 assigned to implement step S6 of the routine of FIG. 5 (routine of FIG. 6), a portion of the front steering controller 200 assigned to execute the front steering angle control routine of FIG. 10, and the vehicle parameter estimating device 106 cooperate with each other to constitute a tire slip angle control portion of the vehicle attitude control apparatus, which is adapted to control the tire slip angle of each wheel such that the absolute value of the tire slip angle is smaller when the yaw moment control braking device 102 as one form of the longitudinal force control device is in operation, when the device 102 is not in operation. The tire slip angle control portion includes first slip angle reducing means for reducing the tire slip angle on the basis of a longitudinal force which acts on the wheel and which is controlled by the longitudinal force control device 102 when the longitudinal force control device is operated concurrently with the rear or front steering control device 100, 104 as one form of the lateral force control device. The tire slip angle control portion further includes second slip angle reducing means for reducing the tire slip angle such that the tire slip angle is smaller for one of the wheels 10, 12 whose longitudinal force should not be increased, than for another of the wheels whose longitudinal force should be increased.

While the present invention has been described in detail in its presently preferred embodiment of the invention, it is to be understood that the invention is not limited to the details of the illustrated embodiment, but may be embodied with various changes, modifications and improvements, which may occur to those skilled in the art, in the light of the foregoing teachings, and without departing from the spirit and scope of the invention defined in the following claims.

What is claimed is:

1. An apparatus for controlling an attitude of a motor vehicle, comprising:

a longitudinal force control device for controlling a torque of a wheel of the motor vehicle to thereby control a longitudinal force which acts in a longitudinal direction of the vehicle between the wheel and a road surface; and a tire slip angle control portion for controlling a tire slip angle of said wheel such that an absolute value of the tire slip angle is smaller when said longitudinal force control device is in operation than when said longitudinal force control device is not in operation.

2. An apparatus according to claim 1, further comprising a lateral force control device for controlling a steering angle of said wheel to thereby control a lateral force which acts in a lateral direction of the vehicle between the wheel and the road surface, and wherein said tire slip angle control portion includes first slip angle reducing means for reducing the absolute value of said tire slip angle when said longitudinal force control device is in operation, such that an amount of reduction of said absolute value is determined on the basis of said longitudinal force which is to be established by an operation of said longitudinal force control device concurrently with an operation of said lateral force control device.

3. An apparatus according to claim 2, wherein said tire slip angle control portion further includes second slip angle reducing means for reducing the absolute value of said tire slip angle when said longitudinal force control device is in operation, such that said amount of reduction of said absolute value is smaller when said longitudinal force acting between said wheel and said road surface should not be increased, than when said longitudinal force should be increased.

4. An apparatus according to claim 3, wherein said second slip angle reducing means effects a determination as to whether said longitudinal force should be increased or not, depending upon a location of said wheel in said vehicle.

5. An apparatus according to claim 1, wherein said wheel is a rear wheel, said apparatus further comprising a rear steering control device as a lateral force control device for controlling a steering angle of said rear wheel to thereby control a lateral force which acts in a lateral direction of the vehicle between the wheel and the road surface, said rear steering control device comprising a sensor device for obtaining information indicative of running parameters of the motor vehicle, a rear steering actuator for changing the steering angle of said rear wheel, and a rear steering controller for determining a target value of the steering angle of the rear wheel on the basis of output signals of said sensor device and controlling said rear steering controller such that an actual value of the steering angle of the rear wheel coincides with said target value.

6. An apparatus according to claim 1, wherein said longitudinal force control device includes a torque control device for controlling torque values of a right and a left wheel of the vehicle independently of each other, said torque control device comprising a sensor device for obtaining information indicative of running parameters of the motor vehicle, a torque control actuator for changing said torque values of said right and left wheels, and a torque controller for determining a target value of a difference between said torque values of the right and left wheels on the basis of output signals of said sensor device and controlling said torque control actuator such that an actual value of said difference coincides with said target value.

7. An apparatus according to claim 6, wherein said torque control actuator of said torque control device includes a brake actuator comprising a solenoid-operated pressure control device which is electromagnetically controlled to regulate braking pressures to be applied to wheel brake cylinders for braking said right and left wheels to thereby control braking forces acting on said right and left wheels.

8. An apparatus according to claim 5, wherein said rear steering controller comprises target determining means for determining said target value of the steering angle of said rear wheel irrespective of whether said longitudinal force control device is in operation or not, and target adjusting means for reducing said target value determined by said target determining means if said longitudinal force control device is in operation, said target adjusting means constituting a part of said tire slip angle control portion.

9. An apparatus according to claim 1, further comprising a lateral force control device for controlling a lateral force which acts in a lateral direction of the vehicle between the wheel and the road surface, and wherein said longitudinal force control device is operated to control said longitudinal force only when the attitude of the vehicle cannot be corrected by an operation of said lateral force control device.

10. An apparatus according to claim 2, wherein said first slip angle control means of said tire slip angle control portion determines said amount of reduction of said absolute value of said tire slip angle of said wheel such that said amount of reduction increases with an increase in said longitudinal force which is to be established by the operation of said longitudinal force control device concurrently with the operation of said lateral force control device.

11. An apparatus according to claim 4, wherein said tire slip angle control portion further includes a vehicle parameter estimating device for determining whether an actual lateral force acting on said wheel in said lateral direction is increasing or decreasing with an increase in said tire slip angle, and third slip angle reducing means for changing the absolute value of said tire slip angle depending upon a result of determination by said vehicle parameter estimating device, as well as said longitudinal force which is to be established by the operation of said longitudinal force control device concurrently with the operation of said lateral force control device, and said location of said wheel in said vehicle.

12. An apparatus for controlling an attitude of a motor vehicle, comprising:

a lateral force control device for controlling a steering angle of a wheel of the motor vehicle to thereby control a lateral force which acts in a lateral direction of the vehicle between said wheel and a road surface;

a longitudinal force control device for controlling a torque of said wheel to thereby control a longitudinal force which acts in a longitudinal direction of the vehicle between said wheel and the road surface; and a tire slip angle control portion for controlling a tire slip angle of said wheel such that an absolute value of the tire slip angle is smaller when said lateral force control device and said longitudinal force control device are concurrently operated, than when only said lateral force control device is operated alone.

13. An apparatus according to claim 12, wherein said tire slip angle control portion comprises slip angle reducing means for reducing the absolute value of said tire slip angle when said lateral and longitudinal force control devices are concurrently operated, such that said amount of reduction of said absolute value is smaller when said longitudinal force acting between said wheel and said road surface should not be increased, than when said longitudinal force should be increased, said slip angle reducing means determining whether said longitudinal force should be increased or not, depending upon a location of said wheel in the vehicle.

14. An apparatus according to claim 1, wherein said tire slip angle control portion controls the absolute value of said tire slip angle such that said absolute value is reduced when said longitudinal force acting between said wheel and said road surface should be increased if said absolute value is kept constant, and such that said absolute value is increased when said longitudinal force should be decreased if said absolute value is kept constant.

15. An apparatus according to claim 1, wherein said longitudinal force control device for controlling said longitudinal force acting between each of a right and a left wheel and said road surface, said longitudinal force control device including a yaw moment control braking device for controlling a difference between braking forces acting on said right and left wheels so as to control a yaw moment of said vehicle, said tire slip angle control portion controlling the absolute value of said tire slip angle of said each of said right and left wheels on the basis of a target value of said yaw moment.

16. An apparatus according to claim 15, wherein said tire slip angle control portion increases the absolute value of said tire slip angle when both of said braking force acting on said each wheel and a lateral force acting on said each wheel in a lateral direction of the vehicle are decreasing with an increase in the absolute value of said tire slip angle and when both of said braking force and said lateral force should be decreased to control said yaw moment, said tire slip angle control portion decreasing said absolute value when said lateral force and said braking force acting on said each wheel are increasing and decreasing, respectively, with said increase in said absolute value and when said lateral force and said braking force should be decreased and increased, respectively, to control said yaw moment.

17. An apparatus according to claim 15, wherein said tire slip angle control portion decreases the absolute value of said tire slip angle when both of said braking force acting on said each wheel and a lateral force acting on said each wheel in a lateral direction of the vehicle are decreasing with an increase in the absolute value of said tire slip angle and when both of said braking force and said lateral force should be increased to control said yaw moment, said tire slip angle control portion increasing said absolute value when said lateral force and said braking force acting on said each wheel are increasing and decreasing, respectively, with said increase in said absolute value and when said lateral force and said braking force should be increased and decreased, respectively, to control said yaw moment.

* * * * *

UNITED STATES PATENT AND TRADEMARK OFFICE
CERTIFICATE OF CORRECTION

PATENT NO.  : 5,762,157

DATED : 9 June 1998

INVENTOR(S) : Yasuo UEHARA

It is certified that error appears in the above-identified patent and that said Letters Patent is hereby corrected as shown below:

| Column | Line | |
|---|---|---|
| 1 | 45 | Change "in" to --In--. |
| 4 | 11 | Change "Lo" to --to--. |
| 10 | 21 | Change "-he" to --the--. |
| 10 | 62 | Change "$\delta_k$" to --$\delta_R$--. |
| 11 | 24 | Change "Do" to --DO--. |
| 11 | 27 | Change "Do" to --DO--. |
| 14 | 45 | After "value)" start new paragraph. |
| 14 | 47 | After "angle)" start new paragraph. |
| 16 | 57 | Delete "15". |

UNITED STATES PATENT AND TRADEMARK OFFICE
CERTIFICATE OF CORRECTION

PATENT NO.    :    5,762,157

DATED    :    9 June 1998

INVENTOR(S)    :    Yasuo UEHARA

It is certified that error appears in the above-identified patent and that said Letters Patent is hereby corrected as shown below:

| Column | Line | |
|---|---|---|
| 17 | 28 | Change "Force" to --force--. |
| 17 | 56 | Change "angle a" to --angle $\alpha$--. |
| 18 | 53 | Change "angle a" to --angle $\alpha$--. |
| 19 | 34 | After "threshold" start new paragraph. |
| 20 | 10 | Change "angle a" to --angle $\alpha$--. |
| 20 | 61 | Change "angle $\alpha$" to --angle $\beta$--. |

Signed and Sealed this

Sixteenth Day of March, 1999

Attest:

Attesting Officer

Q. TODD DICKINSON

Acting Commissioner of Patents and Trademarks